United States Patent
Kim et al.

(10) Patent No.: US 10,649,553 B2
(45) Date of Patent: *May 12, 2020

(54) INPUT DEVICE, ELECTRONIC DEVICE FOR RECEIVING SIGNAL FROM INPUT DEVICE, AND CONTROL METHOD THEREOF

(71) Applicant: Samsung Electronics Co., Ltd., Suwon-si, Gyeonggi-do (KR)

(72) Inventors: Kang-nam Kim, Seongnam-si (KR); Sung-soo Park, Suwon-si (KR); Byung-hoon Kang, Suwon-si (KR); Kang-min Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/446,955

(22) Filed: Jun. 20, 2019

(65) Prior Publication Data

US 2019/0302910 A1 Oct. 3, 2019

Related U.S. Application Data

(63) Continuation of application No. 15/189,686, filed on Jun. 22, 2016, now Pat. No. 10,372,239.

(Continued)

(30) Foreign Application Priority Data

Oct. 2, 2015 (KR) .................. 10-2015-0138932

(51) Int. Cl.
*G06F 3/041* (2006.01)
*G06F 3/0354* (2013.01)
(Continued)

(52) U.S. Cl.
CPC .......... *G06F 3/03545* (2013.01); *G06F 3/038* (2013.01); *G06F 3/0416* (2013.01); *G06F 3/044* (2013.01)

(58) Field of Classification Search
CPC .... G06F 3/03545; G06F 3/038; G06F 3/0416; G06F 3/044
See application file for complete search history.

(56) References Cited

U.S. PATENT DOCUMENTS

2011/0304539 A1 12/2011 Lee et al.
2012/0154340 A1 6/2012 Vuppu et al.
(Continued)

FOREIGN PATENT DOCUMENTS

EP 2 466 431 A1 6/2012
WO 2006/059336 A2 6/2006
(Continued)

OTHER PUBLICATIONS

European Office Action dated May 17, 2019; European Appln. No. 16 814 653.8—1216.

(Continued)

*Primary Examiner* — Insa Sadio
(74) *Attorney, Agent, or Firm* — Jefferson IP Law, LLP

(57) ABSTRACT

An input device and method for control based on input device tilt is provided. The input device includes a conductive tip formed at one end of the input device, a resonant circuit unit configured to generate a response signal corresponding to a signal entering through the conductive tip and output the response signal through the conductive tip, and a connection part formed between the conductive tip and a body of the input device to enclose a periphery of the conductive tip so as to have a part of the conductive tip exposed from one end of the input device. The connection part includes a metal member having a larger cross-section (Continued)

area than a cross-section area of the conductive tip and which affects signal intensity in response to input device tilt as detected by a touch screen of an electronic device.

17 Claims, 26 Drawing Sheets

Related U.S. Application Data

(60) Provisional application No. 62/185,082, filed on Jun. 26, 2015.

(51) Int. Cl.
*G06F 3/038* (2013.01)
*G06F 3/044* (2006.01)

(56) References Cited

U.S. PATENT DOCUMENTS

| | | | |
|---|---|---|---|
| 2012/0327042 A1* | 12/2012 | Harley | G06F 3/03545 345/179 |
| 2013/0249870 A1* | 9/2013 | Slaby | G06F 3/044 345/179 |
| 2013/0269446 A1* | 10/2013 | Fukushima | G01B 5/0004 73/818 |
| 2013/0321335 A1 | 12/2013 | Tokutake | |
| 2014/0028634 A1 | 1/2014 | Krah et al. | |
| 2014/0104224 A1 | 4/2014 | Ih et al. | |
| 2014/0253521 A1 | 9/2014 | Hicks | |
| 2014/0267192 A1 | 9/2014 | Matsuura et al. | |
| 2014/0320445 A1 | 10/2014 | Kim | |
| 2015/0123923 A1 | 5/2015 | Stern | |
| 2015/0160744 A1 | 6/2015 | Mohindra et al. | |

FOREIGN PATENT DOCUMENTS

| | | |
|---|---|---|
| WO | 2012/123951 A2 | 9/2012 |
| WO | 2013/057862 A1 | 4/2013 |
| WO | 2013/065272 A1 | 5/2013 |
| WO | 2013/175819 A1 | 11/2013 |

OTHER PUBLICATIONS

European Office Action dated Nov. 18, 2019; European Appln. No. 16 814 653.8-1216.

* cited by examiner

INPUT DEVICE TILTED

INPUT DEVICE TILTED

TILTED TOWARD RIGHT

- 2010 — Tilt Options [X]
- 2011 — None [X]
- 2012 — Thickness [X]
- 2013 — Shape [X]
- 2014 — Chroma [X]
- 2015 — Color [X]
- 2016 — Brightness [X]
- 2017 — Function [X]
  ⋮

⬇ FUNCTION SELECTED

2020

Function Selected [Cancel]
- Delete — 2021
- Copy — 2022
- Fill — 2023
- Turn on/off — 2024
- Joystick — 2025
- Capture Screen — 2026
- Convert into Main Screen — 2027
  ⋮

INPUT DEVICE, ELECTRONIC DEVICE FOR RECEIVING SIGNAL FROM INPUT DEVICE, AND CONTROL METHOD THEREOF

CROSS-REFERENCE TO RELATED APPLICATION(S)

This application is a continuation application of prior application Ser. No. 15/189,686, filed on Jun. 22, 2016, which claimed the benefit under 35 U.S.C. § 119(e) of a U.S. Provisional application filed on Jun. 26, 2015 in the United States Patent and Trademark Office and assigned Ser. No. 62/185,082, and under 35 U.S.C. § 119(a) of a Korean patent application filed on Oct. 2, 2015 in the Korean Intellectual Property Office and assigned Serial number 10-2015-0138932, the entire disclosure of each of which is hereby incorporated by reference.

TECHNICAL FIELD

The present disclosure relates to an input device. More particularly, the present disclosure relates to an electronic device which is controlled by a signal input from the input device, and a control method thereof.

BACKGROUND

Due to the development of electronic technology, various kinds of electronic devices have been developed and distributed.

In particular, smartphones or tablet personal computers (PCs) which can be carried by users have become widely used in recent years. The typical smartphone or tablet PC is provided with a touch screen, and the user can control the functions of the electronic device using the touch screen.

The user can touch the touch screen using an input device of a pen type as well as a user's body (for example, a finger, etc.) The electronic device may perform various control operations according to touch coordinates of a point on the touch screen which is touched by the user's body or input device, and a menu or an icon displayed on the touch coordinates.

The input devices may be classified by their implementing methods, such as a capacitive coupling method, an electro magnetic resonance (EMR) method, and an active method.

In the case of the EMR method, the input device includes a coil for inducing electricity by means of an external magnetic field signal. In the active method, the input device may further include a battery.

When the input device is implemented in the capacitive coupling method, the input device may include a conductive tip. Accordingly, when the conductive tip of the input device touches the touch screen of the electronic device or approaches within a predetermined distance, capacitive coupling is achieved between the conductive tip and electrodes in the touch screen.

However, the conductive tip in the related-art input device is often designed to be small in order to input selections very narrowly and precisely. Therefore, there is a problem that coupling capacitance between the conductive tip and the touch screen is so small that transmission and reception efficiency deteriorates.

If a large conductive tip is made to solve this problem, there is a problem that an input point is wrongly recognized when the input device is tilted or otherwise poorly placed.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are provided to address at least the above mentioned problems and/or disadvantages, and to provide at least the advantages described below. Accordingly, an aspect of the present disclosure provides an input device which can enhance transmission and reception efficiency and allow an electronic device to recognize an exact input point, an electronic device which is controlled by such an input device, and a control method thereof.

Another aspect of the present disclosure is to provide an input device. The input device includes a conductive tip formed at one end of the input device, a resonant circuit unit configured to generate a response signal corresponding to a signal received by the conductive tip and output the response signal through the conductive tip, and a connection part formed between the conductive tip and a body of the input device to enclose a periphery of the conductive tip so as to have a part of the conductive tip exposed from one end of the input device. The connection part may include a metal member having a larger cross-section area than a cross-section area of the conductive tip.

In accordance with another aspect of the present disclosure, an electronic device is provided. The electronic device includes a touch screen, an electrode unit configured to receive a signal which is generated in an input device in response to the input device touching or approaching the touch screen, and a processor configured to analyze, in response to the signal being received at a plurality of electrodes in the electrode unit, signals received through the plurality of electrodes, detect a tilt or similar characteristic of the input device based on the analyzed signals, and compensate an input point on the touch screen according to the tilt characteristic.

In accordance with another aspect of the present disclosure, a control method of an electronic device is provided. The control method includes operations for receiving a signal which is generated in an input device touching or approaching a touch screen of the electronic device and in response to the signal being received at a plurality of electrodes in the electrode unit, analyzing signals received through the plurality of electrodes, detecting a tilt or similar characteristic of the input device, and compensating an input point on the touch screen based on the tilt characteristic.

According to various embodiments of the present disclosure, transmission and reception efficiency between electronic devices can be improved and an input point can be prevented from being wrongly recognized. In addition, various interactions can be performed using the tilt characteristic of the electronic device.

Other aspects, advantages, and salient features of the present disclosure will become apparent to those skilled in the art from the following detailed description which, taken in conjunction with the annexed drawings, disclose various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 20 is a view illustrating an example of a method for setting options or functions matching a tilt characteristic of an input device according to an embodiment of the present disclosure;

Throughout the drawings, like reference numerals will be understood to refer to like parts, components, and structures.

DETAILED DESCRIPTION

Figure 1:
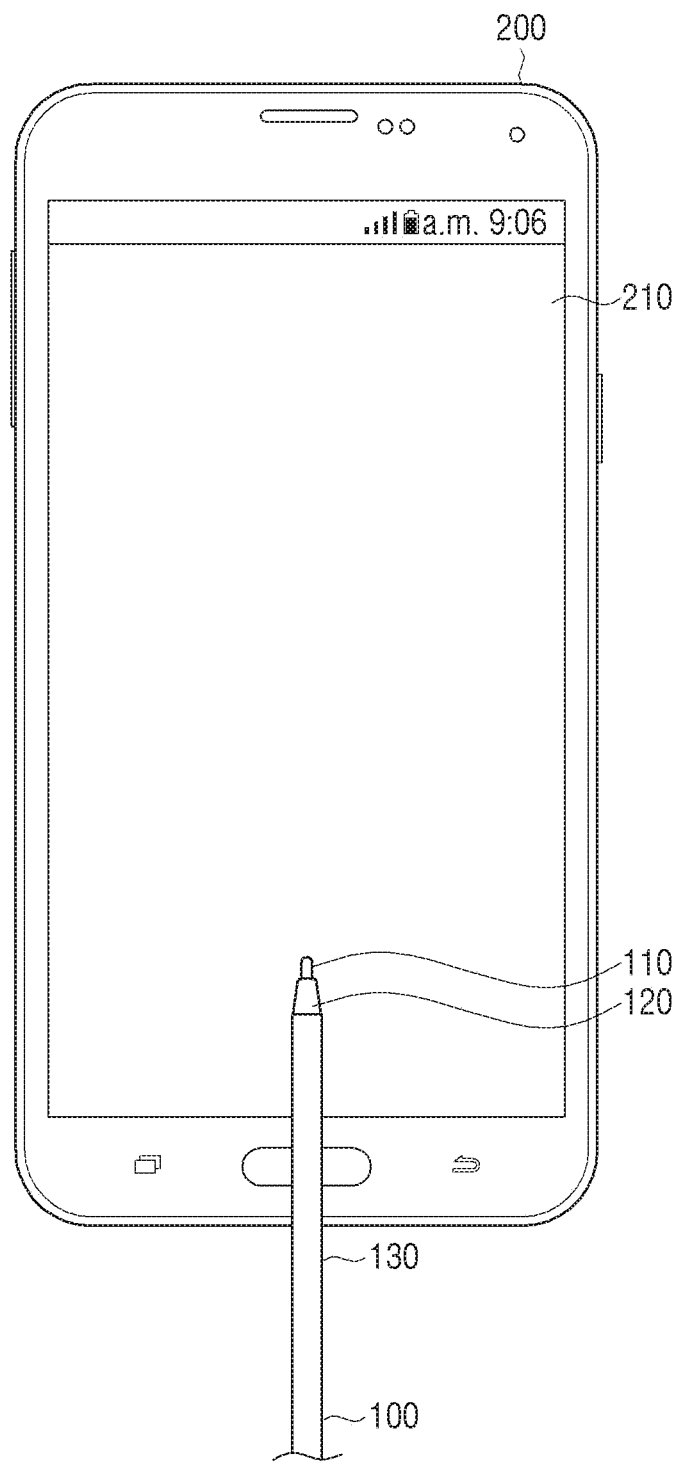
FIG. 1 is a view illustrating operations of an input device and an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

The term such as "first" and "second" used in various embodiments of the present disclosure may modify various elements regardless of an order and/or importance of the corresponding elements, but does not limit the corresponding elements. These terms may be used for the purpose of distinguishing one element from another element. For example, a first user device and a second user device may indicate different user devices regardless of the order or importance. For example, a first element may be named a second element without departing from the scope of various embodiments of the present disclosure, and similarly, a second element may be named a first element.

It will be understood that when an element (for example, a first element) is "(operatively or communicatively) coupled with/to" or "connected with" another element (for example, a second element), the element may be directly coupled with/to another element, and there may be an intervening element (for example, a third element) between the element and another element. To the contrary, it will be understood that when an element (for example, a first element) is "directly coupled with/to" or "directly connected to" another element (for example, a second element), there is no intervening element (for example, a third element) between the element and another element.

The terms used in various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various embodiments of the present disclosure. According to circumstances, even the terms defined in the embodiments of the present disclosure should not be interpreted as excluding the embodiments of the present disclosure.

Hereinafter, various embodiments of the present disclosure will be described in detail with reference to the accompanying drawings.

FIG. 1 is a view illustrating operations of an input device and an electronic device according to an embodiment of the present disclosure.

Referring to FIG. 1, a mobile phone is illustrated as an electronic device 200, but this should not be considered as limiting. The electronic device 200 may be implemented in various forms. For example, the electronic device 200 may be implemented by various kinds of electronic devices such as a tablet personal computer (PC), a laptop PC, a television (TV), an Moving Picture Experts Group phase 1 or phase 2 (MPEG-1 or MPEG-2) audio layer 3 (MP3) player, a game console, a kiosk, an electronic album, a table display, a monitor, etc. In addition, the electronic device 200 may refer to all kinds of device components or elements including a touch screen 210 or a touch pad. In addition, the term "electronic device" is used in this specification, but various terms such as "user terminal device," "display device," etc. may be used.

A user may use the electronic device 200 by touching or hovering the touch screen 210 with a user's finger, fingers or input device, such as the input device 100. The input device 100 may be of a pen type, but embodiments are not limited thereto. Alternatively, the input device 100 may be referred to using various names such as pen, stylus pen, electronic pen, touch pen, S-pen, etc. However, for clarity, the term "input device 100" will be used in this specification.

When the input device 100 is implemented as the pen type, the input device 100 may be inserted into a recess (not shown) provided on the electronic device 200 for storage or otherwise. The user may withdraw the input device 100 from the recess to use the input device 100. In response to the input device 100 being withdrawn from the recess, the electronic device 200 may automatically display an icon or icons regarding an application or function which is suitable to use with the input device 100, or may automatically execute an application or function which is suitable to use with the input device 100.

Referring to FIG. 1, the input device 100 includes at least one conductive tip 110. The conductive tip 110 is formed at one end of the input device 100. According to an embodiment of the present disclosure, a second conductive tip (not shown) can be formed at an opposite end of the input device and have same or different characteristics as the conductive tip 110 to thereby perform similar or different functions. The conductive tip 110 is formed of a material such as metal, and is mechanically and/or electrically connected to a resonant circuit unit (not shown) in the input device 100. The resonant circuit unit (not shown) generates a signal corresponding to a signal entering through the conductive tip 110, and outputs the signal through the conductive tip 110. In this specification, the signal output from the electronic device 200 is referred to as a transmission signal, and the signal output from the input device 100 is referred to as a response signal for convenience of explanation.

The conductive tip 110 may have a part exposed to the outside in order to directly contact the touch screen 210 of the electronic device 200, and may further include a coating layer 111 (see FIG. 5A) formed on an outer surface of the conductive tip 110 to soften a user's handwriting action, for example, an insulating material layer such as rubber, plastic, glass, etc.

A connection part 120 is formed between the conductive tip 110 and a body 130 of the input device 100. The body 130 is a part which forms an exterior of the input device 100.

The connection part 120 may be connected to the body 130 by means of spiral coupling (for example, threaded coupling), detents, adhesive, and/or may be integrally formed with the body 130. The connection part 120 may be formed to enclose the periphery of the conductive tip 110 so that a part of the conductive tip 110 protrudes from one end of the input device 100. In doing so, one part of the conductive tip 110 is exposed to the outside of the input device 100 by the connection part 120, and the other part is located inside the connection part 120 and/or the input device 100.

The connection part 120 includes a metal member having a cross-section area larger than that of the conductive tip 110, but embodiments are not limited thereto. In this specification, the term "connection part 120" is used to denote the connection part 120 formed between the conductive tip 110 and the body 130, but various terms such as antenna, conical pen end, support, etc., may be used to denote the connection part 120. Hereinafter, the term "connection part" will be used throughout the specification.

The connection part 120 may be formed of metal and may be electrically connected with the conductive tip 110, and accordingly, may form a single electrode with the conductive tip 110. The connection part 120 may be located on and around the periphery of the conductive tip 110. Accordingly, in response to the input device 100 touching or approaching the touch screen 210 of the electronic device 200, the connection part 120 as well as the conductive tip 110 may serve as a kind of electrode. As a result, a facing area between the electrode in the touch screen 210 and the electrode (that is, the conductive tip 110 and the metal member of the connection part 120) in the input device 100 increases, and thus coupling capacitance also increases. Therefore, an intensity of transmission and reception signal increases.

In addition, in response to the input device 100 being tilted by the user, a metal member of the connection part 120 at a tilted side gets closer to the touch screen 210 and thus, the intensity of signal received at an electrode in the touch screen 210 which is close to the metal member of the connection part 120 increases. The electronic device 200 may determine a tilt or similar characteristic of the input device 100 using the distribution of signals detected in the electrodes, a signal difference, etc. The tilt characteristic may include a tilt direction, a tilt angle, etc. of the input device 100. When the user uses the input device 100 in an upright position on the touch screen, the tilt may be minimal, such as 0 degrees relative to a Y axis perpendicular to the planar surface of the touch screen 210, and, when the input device 100 is placed on the touch screen in parallel, the tilt may be maximum, such as 90 degrees relative to the Y axis perpendicular to the planar surface of the touch screen 210. In this case, the tilt of the input device 100 may have a range from about 0 to about 90 degrees relative to the Y axis perpendicular to the planar surface of the touch screen 210. In response to the tilt characteristic being detected, the electronic device 200 may perform various control operations using the tilt characteristic.

Figure 2:
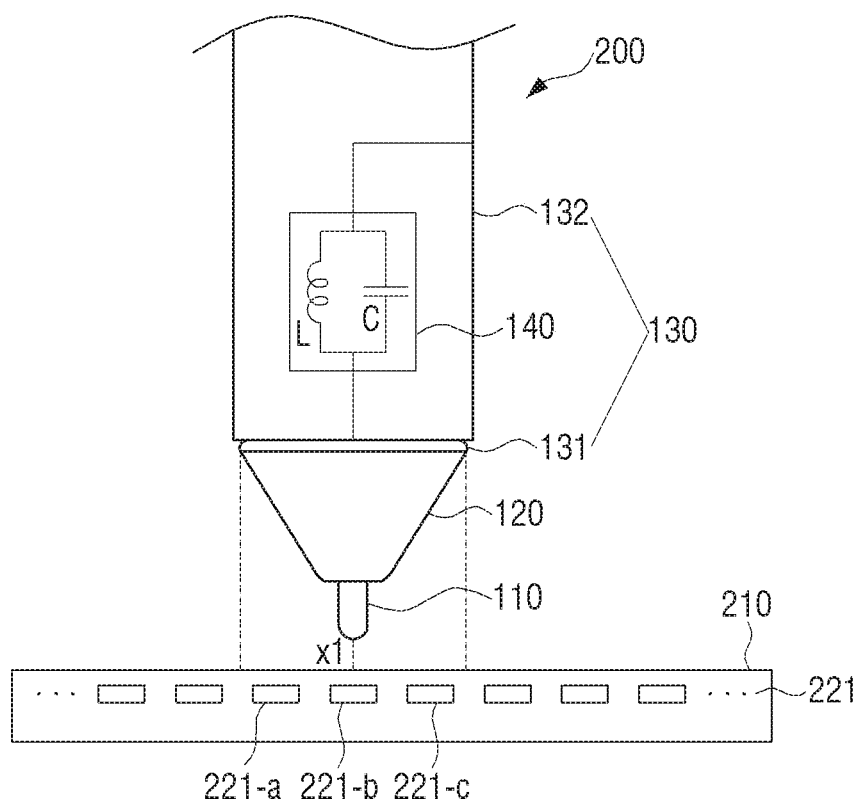
FIGS. 2 and 3 are views illustrating a method for using an input device according to an embodiment of the present disclosure.
Figure 3:
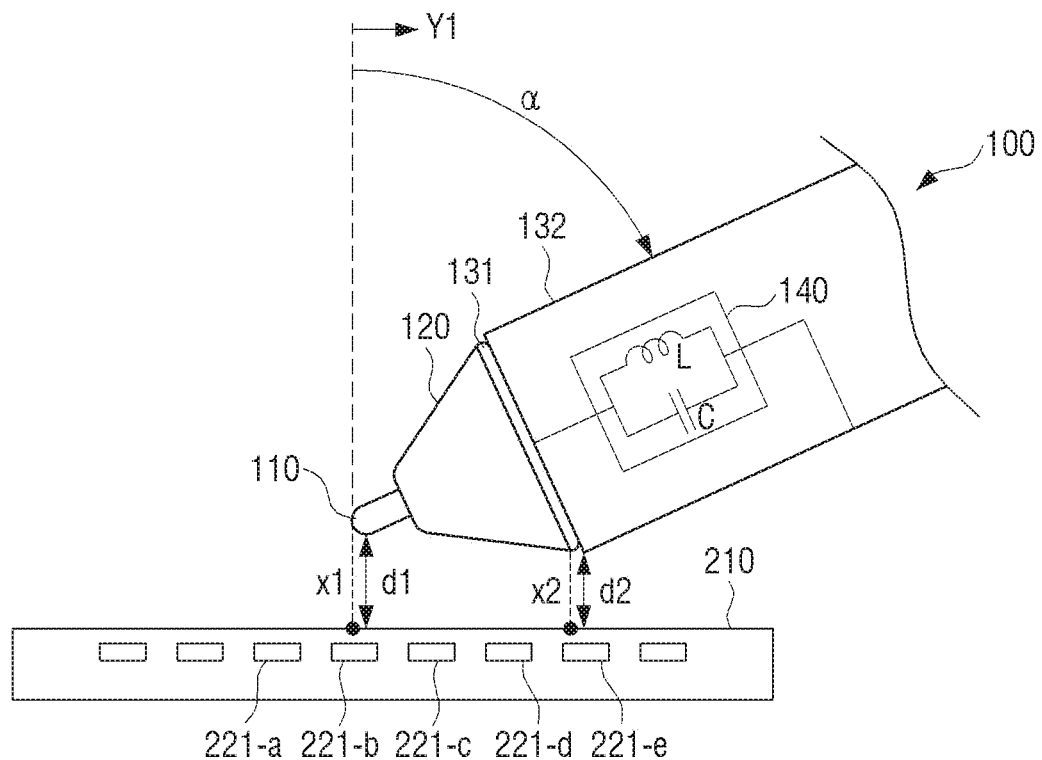

FIGS. 2 and 3 are views illustrating a method for using an input device according to an embodiment of the present disclosure.

FIG. 2 is a view showing a case in which an input device is used in an upright position on a surface of a touch screen. Referring to FIG. 2, an input device 100 stands upright relative to the planar surface of a touch screen 210. However, this case may include a case in which the input device 100 is tilted within a predetermined allowable range.

A plurality of electrodes 221 are arranged in the touch screen 210. The plurality of electrodes 221 may be arranged in a row in vertical and horizontal directions, but only the electrodes arranged in one direction are illustrated in FIGS. 2 and 3 for convenience of explanation.

A connection part 120 of the input device 100 is formed of metal. A body 130 of the input device 100 includes an insulator 131 and a case 132. In addition, a resonant circuit unit 140 is disposed inside the input device 100.

The resonant circuit unit 140 may include a circuit in which at least one capacitor C and at least one inductor L are connected with each other in parallel, but embodiments are not limited thereto. Such a circuit may have a high-impedance characteristic at a specific resonant frequency.

In addition, when the input device 100 further includes a pen pressure module, the resonant circuit unit 140 may further include a variable capacitor. The pen pressure module refers to a module having a structure in which, in response to a pressure being applied in the lengthwise direction of a conductive tip 110, capacitance is changed according to the pressure. For example, in response to the user putting the conductive tip 110 of the input device 100 on the touch screen 210 and strongly pressing the conductive tip 110, the conductive tip 110 is pushed into the input device 100, thereby changing a facing area between inner electrodes. Accordingly, since capacitance provided to the resonant circuit unit 140 is changed, the pen pressure module may function as a variable capacitor. Such a variable capacitor is connected with the resonant circuit unit 140 in parallel, and thus, in response to the pen pressure being changed by the user, the capacitance of the entire resonant circuit unit 140 is changed and accordingly, the resonant frequency of the resonant circuit unit 140 may be changed. When the pen pressure module is added, the conductive tip 110 of the input device 100 may be manufactured to be able to be disconnected from or moveable relative to the connection part 120, insulator 131 and/or case 132, and move into the input device 100 by a predetermined distance. An elastic member may be additionally used to restore the conductive tip 110 to the original position when pressure is released.

The case 132 is formed of a conductive material. The case 132 may be electrically connected with the resonant circuit unit 140 in the input device 100 to serve as a ground. The insulator 131 provides insulation between the connection part 120 and the case 132. In FIGS. 2 and 3, the insulator 131 is integrally formed with the case 132, but the insulator 131 may be formed on the connection part 120. For example, the connection part 120 may be formed by forming the metal member and the insulator integrally with each other, and may be connected to the case 132 by assembly.

In response to the input device 100 approaching or touching the touch screen as shown in FIG. 2, the electrodes 221-a, 221-b and 221-c which are close to the conductive tip 110 and the connection part 120 from among the electrodes 221 in the touch screen 210 of the electronic device 200, may receive response signals. The connection part 120 as well as the conductive tip 110 may be formed of metal and thus the area or number of electrodes in which signals are detected may be increased.

In FIG. 2, the conductive tip 110 is located over one electrode 221-b in the upright position or when tilted within a predetermined allowable range, and the connection part 120 is located over the neighboring electrodes 221-a and 221-c. Accordingly, the plurality of electrodes 221-a, 221-b and 221-c receive the response signals, and the response signal received at one of them, the electrode 221-b, is the signal of greatest intensity. The electronic device 200 determines that the point of the electrode 221-b at which the signal of greatest intensity is detected, is an input point x1 over which the conductive tip 110 is located. In response to the signals received at the electrodes 221-a and 221-c adjacent to the input point and being determined to have similar signal intensity, the electronic device 200 may determine that the input device 100 is upright or tilted within a predetermined allowable range relative to the Y axis perpendicular to the planar surface of the touch screen 210.

Referring to FIG. 3, the input device 100 which is tilted by an angle of α in one direction relative to the Y axis perpendicular to the planar surface of the touch screen 210 is illustrated. In this case, a distance d2 between the metal member 120 and the touch screen 210 may be smaller than a distance d1 between the conductive tip 110 and the touch screen 210.

Compared with the case of FIG. 2, the location of the electrode 221-b over which the conductive tip 110 is located, that is, the input point x1 is the same, but the area of the electrodes 221-b, 221-c, 221-d and 221-e in which signals are detected increases and the electrode in which the greatest intensity of signal is detected is also changed to the electrode 221-e. Accordingly, x2 is likely to be recognized as the input point. However, the electronic device 200 can compensate for this recognition by considering the electrode in which the greatest intensity of signal is detected and the distribution of intensities of the neighboring electrodes and based thereon, shifting the input point from x2 to x1. For example, based on detected tilt and/or tilt angle, the electronic device 200 can compensate and shift the input point from x2 to x1.

In addition, the electronic device 200 may determine that the input device 100 is tilted in a Y1 direction based on the change in the number of electrodes in which signals are detected from 3 electrodes (that is, 221-a, 221-b and 221-c as illustrated in FIG. 2) to 4 electrodes (that is, 221-b, 221-c, 221-d and 221-e as illustrated in FIG. 3), and the greatest intensity of signal is detected in the last electrode 221-e from among the electrodes in which signals in the Y direction are detected.

In addition, a tilt angle may be determined based on the intensity of the signal received at each of the electrodes 221-b, 221-c, 221-d and 221-e. For example, the electronic device 200 may compare the intensity of the signal of the first electrode 221-b in which the signal in the Y direction is detected, and the intensity of the signal of the last electrode 221-e, and determine the tilt angle based on a difference between the intensities of the signals.

In the above-described example, the first electrode 221-b and the last electrode 221-e have been mentioned for convenience of explanation. However, signals may be detected in a plurality of neighboring electrodes when real measurement is performed, and the tilt characteristic may be determined by sampling only a predetermined number of electrodes (for example, three, five, or seven electrodes) from among the electrodes in which signals of higher than a predetermined intensity are detected.

As described above, the input device 100 includes the conductive tip 110 and the connection part 120. The characteristic of the input device 100 may vary according to the shape or size of the metal member of the connection part 120. Hereinafter, various examples of the shape of the connection part 120 will be explained in detail.

Figure 4:
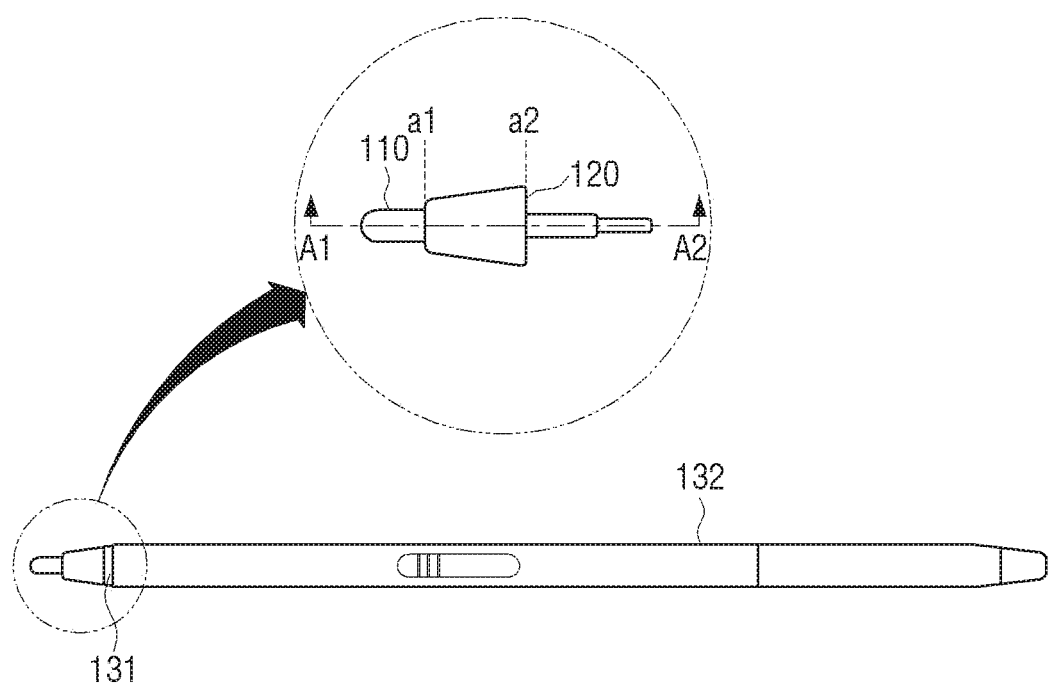
FIG. 4 is a view illustrating an example of an exterior of an input device according to an embodiment of the present disclosure.

FIG. 4 is a view illustrating an example of an exterior configuration of an input device according to an embodiment of the present disclosure.

Referring to FIG. 4, a metal member of a connection part 120 of a connection device may have a conical shape, but embodiments are not limited thereto. The conical shape refers to a shape having a cross-section area gradually increasing in one direction. In the case of FIG. 4, the cross-section area of the metal member gradually increases from one end a1 to another end a2 along a center axis. A conductive tip 110 is electrically connected with the connection part 120, and the case 132 and the connection part 120 are insulated from each other by the insulator 131.

Figure 5A:
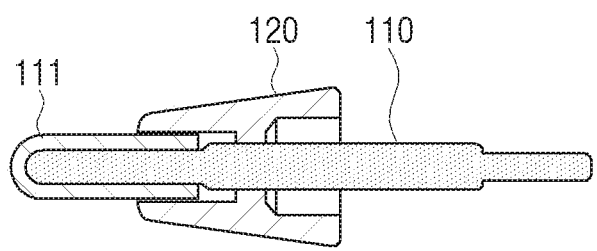
FIGS. 5A to 5C are cross-sectional views illustrating a detailed configuration of a connection part of an input device of FIG. 4 according to an embodiment of the present disclosure.

FIG. 5A is a cross-sectional view of a connection part of FIG. 4 taken along line A1-A2 according to an embodiment of the present disclosure.

Referring to FIG. 5A, a conductive tip 110 penetrates through a connection part 120 and extends into an input device 100. A coating layer 111 may be formed on a part of the conductive tip 110 which is exposed to the outside of the connection part 120.

In the above-described embodiment of the present disclosure, the conductive tip 110 and the connection part 120 of the input device 100 can be separated from each other. However, the metal member of the connection part 120 and the conductive tip 110 may be integrally formed with each other. Alternatively, the conductive tip 110 and the connection part 120 may be physically in contact with each other and may be used in a short-circuited state even if they are not integrally formed.

Figure 5B:
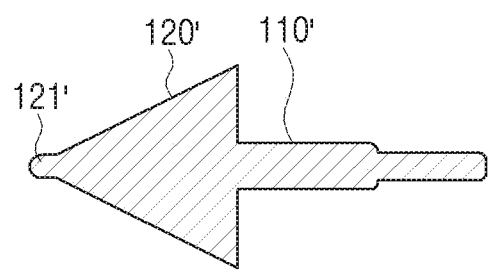
Figure 5C:
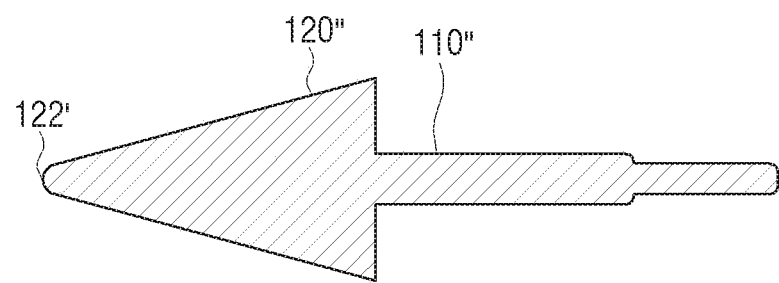

FIGS. 5B and 5C are cross-sectional views illustrating a configuration of an input device in which a conductive tip and a connection part are integrally formed with each other according to another embodiment of the present disclosure.

Referring to FIG. 5B, a conductive tip 110' and a connection part 120' which are integrally formed with each other by way of an example are illustrated. The conductive tip 110' and the connection part 120' are formed of the same metal or material having similar conductivity properties. The connection part 120' has a protrusion 121' formed at a leading end of the connection part 120' as a part which will contact the touch screen 210, and a coating layer (not shown) may be formed on the outer surface of the protrusion 121'.

Referring to FIG. 5C, a conductive tip 110" and a connection part 120" which are integrally formed with each other in another example are illustrated. In this case, the protrusion 121' of FIG. 5B is not formed at the leading end of the connection part 120" and a rounding portion 122' having a predetermined curvature may be formed to facilitate a sliding movement when the input device 100 contacts the touch screen 210.

In addition, the conductive tip may be manufactured to penetrate through the connection part and elastically move in and out of the connection part. In this case, a spring or other elastic members may be additionally provided in the connection part or the body of the input device. In response to the user putting the conductive tip of the input device on a surface of a touch screen 210 and pressing the input device against the surface of the touch screen 210, the conductive tip is pushed into the connection part along a center axis of the input device. The elastic member normally keeps the conductive tip pushed out of the connection part, and provides appropriate elasticity in response to the conductive tip being pushed into the connection part by an external force. In response to the external force being removed, the elastic member provides a restoring force to restore the conductive tip to the original position. Although not shown, a stopper or detent may be additionally provided to prevent the conductive tip from falling out of the connection part.

When the conductive tip is configured to be able to elastically move in and out of the connection part as described above, a pen pressure module may be additionally provided. The pen pressure module may provide variable capacitance to the resonant circuit unit according to a change in the facing area between the electrode connected to the conductive tip and the electrode provided in the electronic device. Accordingly, a variable resonant frequency of a response signal output from the input device may be implemented.

Figure 6:
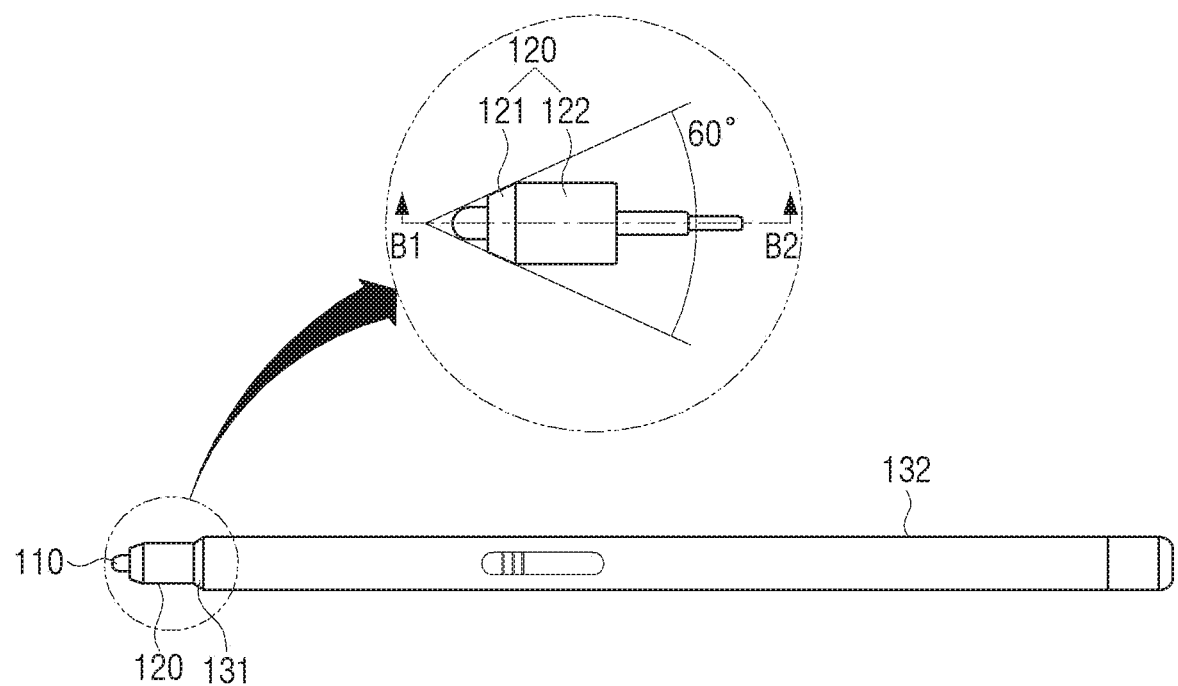
FIG. 6 is a view illustrating another example of an exterior of an input device according to an embodiment of the present disclosure.

FIG. 6 illustrates another example of an exterior configuration of an input device according to an embodiment of the present disclosure.

Referring to FIG. 6, a connection part 120 may include a conical part 121, the cross-section area of which gradually increases from one end near the conductive tip 110 to an opposite end along a center axis, and a cylindrical part 122, the cross-section area of which is uniformly maintained. The conical part 121 may be formed of metal or similar material. The cylindrical part 122 may be formed of metal or may be formed of a nonconductive material, that is, an insulator. When the cylindrical part 122 is formed of metal or similar material, the cylindrical part 122 may be integrally formed with the conical part 121.

An insulator 131 insulates the cylindrical part 122 from the case 132. When the cylindrical part 122 is formed of an insulator, the insulator 131 may be omitted.

The cross-section area of the conical part 121 may gradually increase from the end near the conductive tip 110 along a center axis such that the conical part 121 becomes wider to have a predetermined angle (for example, 60 degrees) relative to the center axis. The cylindrical part 122 may have a shape maintaining the maximum cross-section area of the conical part 121.

Figure 7:
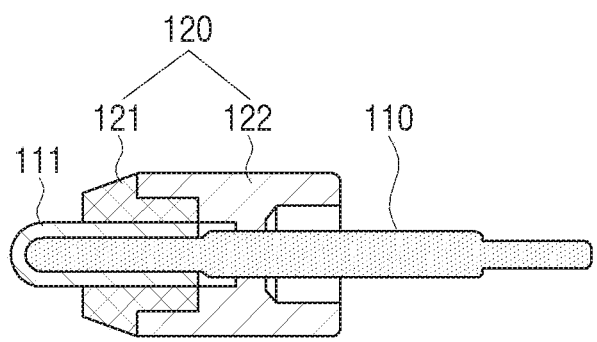
FIG. 7 is a cross-sectional view illustrating a detailed configuration of a connection part of an input device of FIG. 6 according to an embodiment of the present disclosure.

FIG. 7 is a cross-sectional view of a connection part of FIG. 6 taken along line B1-B2 according to an embodiment of the present disclosure.

Referring to FIG. 7, a conductive tip 110 penetrates through a connection part 120 and extends into an input device 100 (not shown). A coating layer 111 may be formed on a part of the conductive tip 110 which is exposed to the outside of the connection part 120. A conical part 121 may be coupled to a cylindrical part 122 by being inserted into the cylindrical part 122.

In addition, the conductive tip 110 and the connection part 120 may be implemented to have various shapes. The signal transmission and reception efficiency between the electronic device 200 and the input device 100 may depend, at least in part, on the shapes and/or sizes of the conductive tip 110 and the connection part 120. This is explained in greater detail below.

Figure 8:
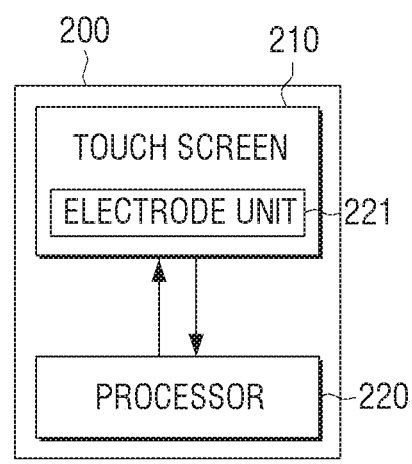
FIG. 8 is a block diagram illustrating a configuration of an electronic device according to an embodiment of the present disclosure.

FIG. 8 is a block diagram illustrating a configuration of an electronic device according to an embodiment of the present disclosure.

Referring to FIG. 8, an electronic device 200 includes a touch screen 210 and a processor 220.

The touch screen 210 refers to a display unit through which the user interacts with the electronic device 200 by touching or hovering using the user's body or an input device 100.

The touch screen 210 may have an electrode unit 221 arranged therein. The electrode unit 221 may receive a signal which is generated in the input device 100 when touching or approaching the touch screen 210, that is, a response signal. The electrode unit 221 may include a plurality of electrodes arranged in a horizontal direction (hereinafter, referred to as first electrodes), and a plurality of electrodes arranged in a vertical direction (hereinafter, referred to as second electrodes).

In response to the response signal being received at one or more electrodes in the electrode unit 221, the processor 220 may analyze the response signal and detect an input point and a tilt characteristic of the input device 100. The processor 220 may use the tilt characteristic in various ways.

For example, in response to a tilt angle of the input device 100 being outside of a predetermined allowable range (where, for example, the input device 100 is not in an upright position), the processor 220 may compensate the input point of the input device 100 considering the tilt characteristic as illustrated by FIG. 3. Specifically, the processor 220 may determine the input point based on the intensity of the response signal received from the input device 100, and then determine a point which is shifted in the opposite direction to a tilt direction considering the tilt direction, the title angle, etc. as the input point.

In response to a tilt angle being within the allowable range (where, for example, the input device 100 is in an upright position), the processor 220 may determine the input point based on the location of at least one electrode which receives the greatest signal intensity from among the plurality of electrodes receiving the response signals as illustrated by FIG. 2. In this case, the processor 220 may not compensate the input point.

In another example, the processor 220 may perform a different control operation according to whether a tilt angle is within the predetermined allowable range or is outside of the predetermined allowable range. For convenience of explanation, a control operation performed when a tilt angle is within the allowable range is referred to as a first control operation, and a control operation performed when a tilt angle is outside of the allowable range is referred to as a second control operation.

The first and second control operations may include various operations, such as executing an application, copying a text or a picture, drawing a writing trace, inactivating the touch screen 210 or the electronic device 200, changing an option of a writing trace, etc.

For example, in response to the conductive tip 110 of the input device 100 being located over one of the icons displayed on the touch screen 210, and a tilt angle of the input device 100 being within the allowable range, the processor 220 may recognize that the corresponding icon is selected and perform the first control operation to execute an application corresponding to the icon. In response to a tilt angle being outside of the allowable range, the processor 220 may perform the second control operation to superimpose a writing trace on the icon and draw the writing trace.

In another example, in response to the user touching the touch screen 210 with the input device 100 and then moving the touch point, the processor 220 may continuously display the writing trace, following the changed location. In response to a tilt angle of the input device 100 being within the allowable range, the processor 220 may display options such as a function of the input device, and thickness, brightness, color, chroma, size, shape, etc. of the writing trace according to default options. In response to a tilt angle of the input device 100 being outside of the allowable range, the processor 220 may change at least one of the options such as the function of the input device, and the thickness, brightness, color, chroma, size, shape, etc. of the writing trace. For example, the processor 220 may display the writing trace thicker than the normal writing trace so as to correspond to the tilt angle.

In addition, the processor 220 may perform various operations using the tilt characteristic of the input device 100. These operations will be explained in detail below with reference to the drawings.

Figure 9:
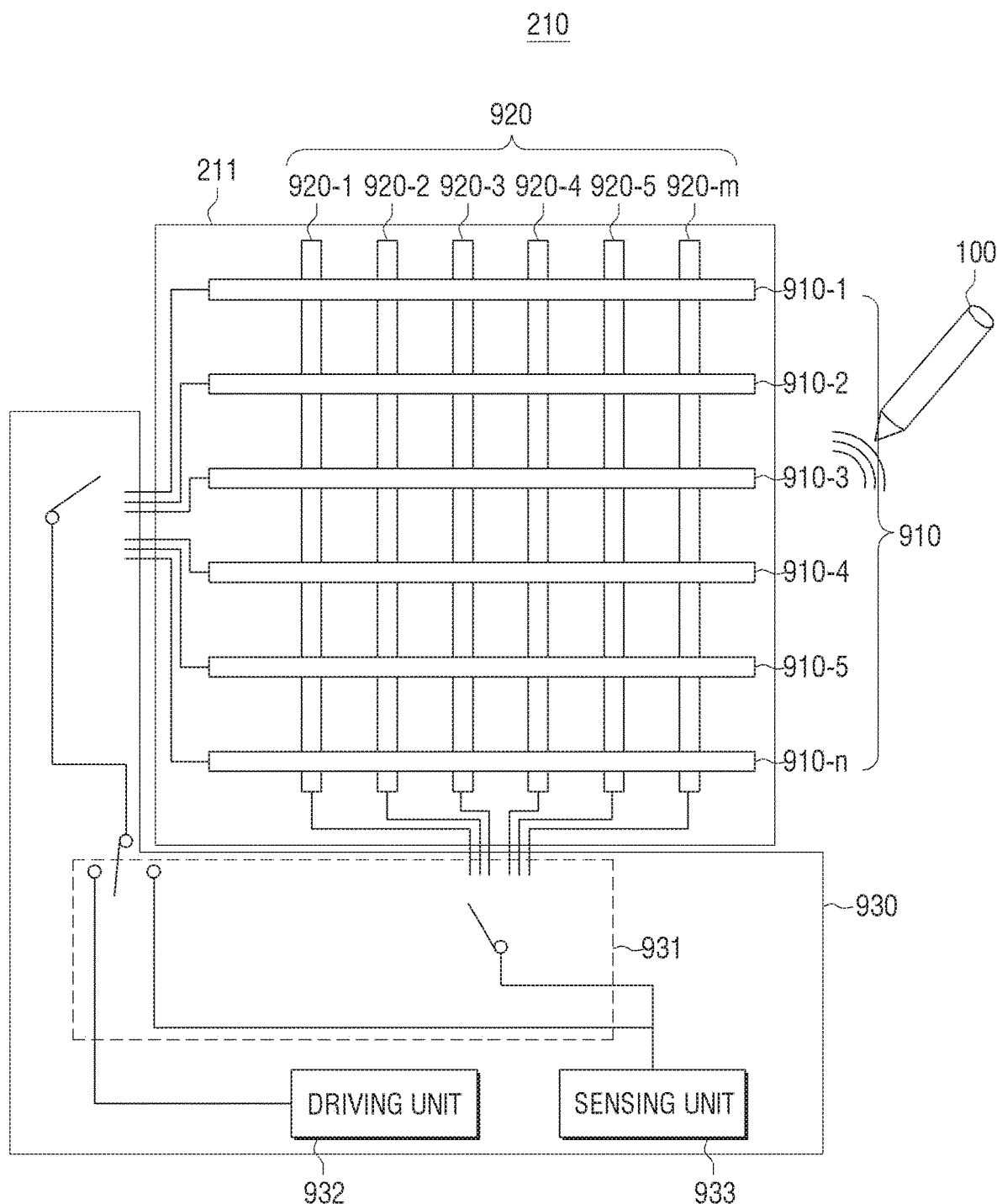
FIG. 9 is a view illustrating an example of an electrode of an electronic device according to an embodiment of the present disclosure.

FIG. 9 is a view illustrating an example of a configuration of an electrode unit of a touch screen according to an embodiment of the present disclosure.

Referring to FIG. 9, a touch screen 210 includes an electrode unit 211 and a panel controller 930.

The electrode unit 211 includes a plurality of electrodes. Specifically, as shown in FIG. 9, the electrode unit 211 includes a first electrode group 910 and a second electrode group 920 which are arranged in different directions.

The first electrode group 910 may include a plurality of first electrodes 910-1, 910-2, 910-3, 910-4, 910-5, . . . , 910-n which are arranged in parallel in a first direction (for example, a vertical direction). The first electrodes may be implemented by using transparent electrodes such as indium tin oxide (ITO), but embodiments are not limited thereto. The plurality of first electrodes 910-1, 910-2, 910-3, 910-4, 910-5, . . . , 910-n may be used as transmission electrodes to output transmission signals (that is, Tx signals) for detecting the location of the input device 100.

The second electrode group 920 may include a plurality of second electrodes 920-1, 920-2, 920-3, 920-4, 920-5, . . . , 920-n which are arranged in parallel in a second direction (for example, a horizontal direction). The second electrodes may also be implemented by using transparent electrodes such as indium tin oxide (ITO), but embodiments are not limited thereto. The plurality of second electrodes 920-1, 920-2, 920-3, 920-4, 920-5, . . . , 920-n may be used as reception electrodes to receive response signals output from the input device 100.

In the illustrated example, each of the electrodes in the electrode group has a rectangular shape, but the electrodes may be arranged in any number of shapes and sizes, including any number of more complicated shapes. In addition, the areas, shapes and number of first electrodes and second electrodes may be the same or may vary according to the shape of the touch screen 210.

The panel controller 930 may output transmission signals and receive response signals using the first electrode group 910 and the second electrode group 920. For convenience of explanation, a period in which the transmission signal is output is referred to as a transmission period, and a period in which the response signal is received is referred to as a reception period. The transmission period and the reception period may alternately repeat. When the touch screen 210 and the above-described electrode unit 211 are integrally formed with each other, a display period may be added between the transmission period and the reception period or before or after the transmission and reception periods.

The panel controller 930 includes a switch unit 931, a driving unit 932, and a sensing unit 933.

The driving unit 932 applies a driving signal to the electrode unit 211 during the transmission period. The driving signal may be a sine wave-type signal having a predetermined resonant frequency, but embodiments are not limited thereto. Specifically, the driving unit 932 may apply an electric signal to the plurality of first electrodes 910-1, 910-2, 910-3, 910-4, 910-5, . . . , 910-n simultaneously or in sequence during the transmission period. Alternatively, the driving unit 932 may apply the electric signal on a basis of a predetermined number of electrodes in sequence (for example, 2-5 electrodes). In this case, the predetermined number of electrodes may be electrodes which are continuously arranged, or may be electrodes which are distributed in a predetermined pattern.

The sensing unit 933 may receive a response signal in each electrode in the electrode unit 211 during the reception period. The method of receiving the response signal may also be performed in various patterns.

According to an embodiment of the present disclosure, the sensing unit 933 may receive the response signal using both the first electrode group 910 and the second electrode group 920. Alternatively, the sensing unit 933 may receive the response signal using only the second electrode group 920 which is not used for transmitting. In addition, the sensing unit 933 may receive the response signal on a basis of an electrode in sequence, and may receive the response signal on a basis of a predetermined number of electrodes. Alternatively, the sensing unit 933 may receive the response signal through all of the electrodes simultaneously.

The sensing unit 933 may perform various signal processing operations with respect to the received response signal. For example, the sensing unit 933 may amplify the response signal using an amplifier. Alternatively, the sensing unit 933 may perform a signal processing operation to perform differential amplification on a basis of two response signals. In addition, the sensing unit 933 may perform a signal processing operation to extract only information in a predetermined frequency domain from the received response signal.

According to an embodiment of the present disclosure, the operations of the driving unit 932, the sensing unit 933, and the switch unit 931 may be controlled by the processor 220, or may be controlled by a micro controller (not shown) separately provided in the panel controller 930. In the present embodiment, the operations are controlled by the processor 220.

The processor 220 may control the driving unit 932, the sensing unit 933, and the switch unit 931 to apply the driving signal and receive the response signal for the electrodes alternately.

For example, the processor 220 may control the driving unit 932 to apply the same driving signal to the plurality of first electrodes 910-1, 910-2, 910-3, 910-4, 910-5, . . . , 910-$n$ simultaneously in a first time period. Then, the processor 220 may control the sensing unit 933 to sense the response signal through at least one electrode (for example, 920-1) in a second time period. Thereafter, the processor 220 may control the driving unit 932 to apply the same driving signal to the plurality of first electrodes 910-1, 910-2, 910-3, 910-4, 910-5, . . . , 910-$n$ again in a third time period, and then control the sensing unit 933 to receive the response signal through another electrode (for example, 920-2) in a fourth time period. The processor 220 may repeat the above-described process as many times as the total number of electrodes. For example, when each of the first and second electrode groups has six electrodes, the processor 220 may repeat the application/reception operation 12 times in total.

In response to the response signals being received at the plurality of electrodes, the processor 220 may determine an input point of the input device 100 based on a ratio of one response signal to the others at the first electrodes 910-1, 910-2, 910-3, 910-4, 910-5, . . . , 910-$n$, and a ratio of one response signal to the others at the second electrodes 920-1, 920-2, 920-3, 920-4, 920-5, . . . , 920-$n$.

For example, in response to the intensity of the response signal of one first electrode 910-3 being greater than the intensities of the response signals of the other first electrodes 910-1, 910-2, 910-4, 910-5, . . . , 910-$n$, and the intensity of the response signal of one second electrode 920-2 being greater than the intensities of the response signals of the other second electrodes 920-1, 920-3, 920-4, 920-5, . . . , 920-$n$, the processor 220 may determine a location where the first electrode 910-3 and the second electrode 920-2 intersect as the input point of the input device 100.

In the above-described example, the driving signals are applied to all of the first electrodes simultaneously during the transmission period. However, the driving signal may be applied on a basis of an electrode in sequence or may be applied on a basis of a plurality of electrodes as described above.

In response to the input device 100 not being exactly located over one electrode and being located between two or more electrodes, the processor 220 may determine the location of the input device 100 using an interpolation method which is based on a ratio between signals received at an electrode which receives the greatest intensity of response signal and an electrode or electrodes adjacent to the corresponding electrode. When the interpolation method is used, a resolution can be improved and thus the input point of the input device 100 can be identified.

The switch unit 931 may selectively connect the plurality of electrodes to the driving unit 932 or may selectively connect the plurality of electrodes to the sensing unit 933. Specifically, the switch unit 931 may connect an electrode to which a driving signal will be applied and the driving unit 932, under control of the processor 220. In this case, the switch unit 931 may ground (that is, electrically couple to a ground potential) or float (that is, electrically uncouple from any potential) the electrode to which the driving signal is not applied. In addition, the switch unit 931 may ground at least one electrode of the plurality of first electrodes and the plurality of second electrodes in the reception period.

In the above-described example, the switch unit 931 is controlled by the processor 220. However, according to an embodiment of the present disclosure, the driving unit 932 may control the switch unit 931 when the driving signal is applied, and the sensing unit 933 may control the switch unit 931 when the response signal is received. In addition, when a separate controller is provided in the panel controller 930 as described above, the switch unit 931 may be controlled by that controller.

In addition, in FIG. 9, the plurality of electrodes are arranged in a matrix formation. However, according to an embodiment of the present disclosure, the electrodes may be arranged in other formations in addition to the matrix formation. In addition, only one driving unit and only one reception unit are illustrated and explained in FIG. 9. However, according to an embodiment of the present disclosure, a plurality of driving units and a plurality of reception units may be provided.

As described above, the electronic device 200 may determine the input point of the input device 100 using the electrode unit 211. As also described above, the connection part 120 of the input device 100 includes a metal member, and thus the intensity of signals transmitted and received between the electronic device 200 and the input device 100 increases due, in part, to the signals communicated by the connection part 120. In addition, the intensity of signals transmitted and received between the electronic device 200 and the input device 100 increases due to tilting of the input device 100, but the electronic device 200 may detect the tilt characteristic of the input device 100 and compensate for the signals and/or input point determination, or may use the tilt characteristic as an input single for controlling separate interactions.

Hereinafter, a method for detecting a tilt characteristic in the electronic device 200 will be explained in detail with various shapes of the connection part.

FIGS. 10A to 10D illustrates various examples of a shape of a connection part and/or input device according to an embodiment of the present disclosure.

Referring to FIGS. 10A to 10D, each of the connection parts 120-1, 120-2, 120-3 and 120-4 shown in FIGS. 10A to 10D may be insulated from the case 132 by the insulator 131.

Figure 10A:
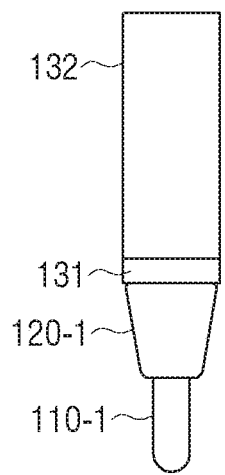
FIGS. 10A to 10D are views illustrating various examples of an input device according to an embodiment of the present disclosure.

FIG. 10A illustrates a case in which a long conductive tip 110-1 is exposed and the connection part 120-1 is formed as a conical metal member (hereinafter, referred to as pen 1).

Figure 10B:
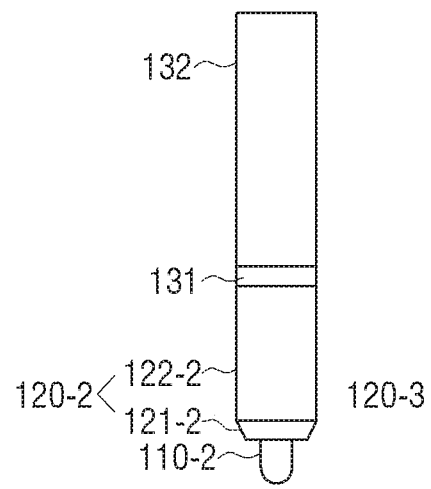

FIG. 10B illustrates a case in which a conductive tip 110-2 has an exposed part that is shorter than the conductive tip 110-1 of pen 1, and the connection part 120-2 is formed of a metal member including a conical part 121-2 and a cylindrical part 122-2 (hereinafter, referred to as pen 2). A gradient in the change of the cross-section area of the conical part 121-2 of pen 2 is relatively greater than in pen 1. The length of the conical part 121-2 in the connection part 120-2 may be shorter than the cylindrical part 122-2.

Figure 10C:
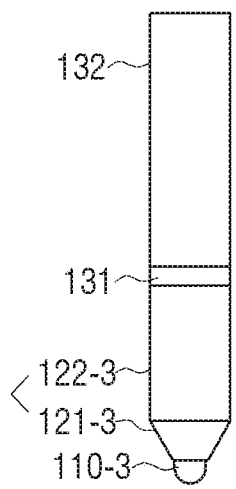

FIG. 10C illustrates a case in which a conductive tip 110-3 has an exposed part that is shorter than the conductive tip 110-2 of pen 2, and the connection part 120-3 is formed of a metal member including a conical part 121-3 and a cylindrical part 122-3 (hereinafter, referred to as pen 3). The length of the conical part 121-3 in the connection part 120-3 of pen 3 may be longer than the length of the conical part 121-2 of pen 2.

Figure 10D:
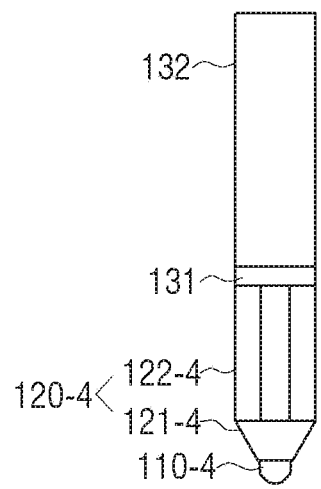

FIG. 10D illustrates a similar structure to that of pen 3, in which the connection part 120-4 has a conical part 121-4 formed of a metal member, and a cylindrical part 122-4 formed of an insulator (hereinafter, referred to as pen 4). A conductive tip 110-4 has an exposed part that is substantially the same as the conductive tip 110-3 of pen 3.

In FIGS. 10A to 10D, the body includes both the insulator 131 and the case 132. However, when a part of the connection part is formed of an insulator as shown in FIG. 10D, the insulator 131 may be omitted.

When a test is conducted on the input device provided with four types of connection parts as shown in FIGS. 10A to 10D in the same condition, the connection parts show the following transmission and reception performance:

TABLE 1

| Rx | Side | Center | / | Tx | Side | Center |
|---|---|---|---|---|---|---|
| Pen 1 | 100% | 100% | | Pen 1 | 100% | 100% |
| Pen 2 | 125% | 109% | | Pen 2 | 128% | 118% |
| Pen 3 | 127% | 111% | | Pen 3 | 129% | 121% |
| Pen 4 | 113% | 105% | | Pen 4 | 108% | 113% |

Table 1 illustrates the transmission and reception performance of pens 2, 3 and 4 as a percentage of the intensity of a signal transmitted and received when pen 1 is used.

In Table 1, Tx refers to a case in which the electronic device 200 transmits a signal (that is, a transmission signal) to the input device 100, and Rx refers to a case in which the input device 100 transmits a signal (that is, a response signal) to the electronic device 200. Center indicates an intensity of a signal transmitted or received at one electrode over which each of the pens is located. In addition, Side indicates an intensity of a signal transmitted or received at neighboring electrodes when each of the pens is located between two electrodes.

Referring to Table 1, in the case of pens 2, 3 and 4, the connection part 120 is closer to the end of the conductive tip 110 than in the case of pen 1. Therefore, as the input device 100 gets closer to the touch screen 210, the transmission and reception efficiency is improved in comparison with pen 1.

Figure 11:
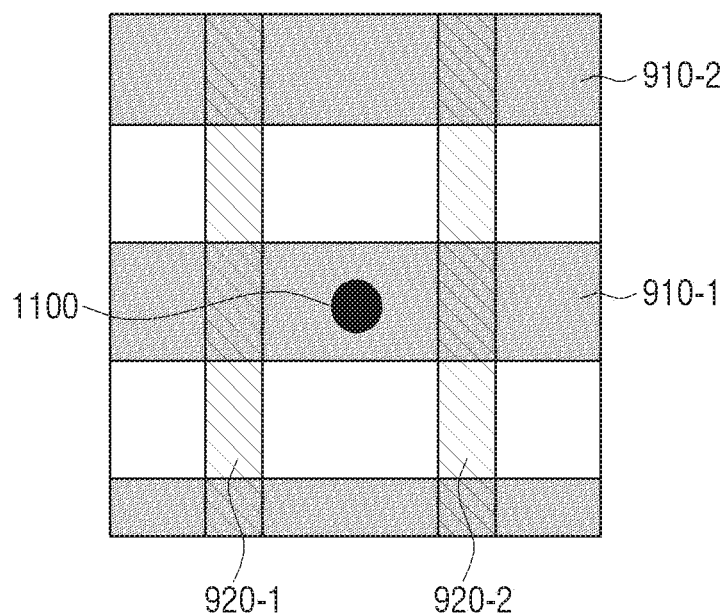
FIG. 11 is a view illustrating a state in which a touch screen is touched by an input device according to an embodiment of the present disclosure.

FIG. 11 is a view illustrating a touch screen in response to a user touching the touch screen with pens shown in FIGS. 10A to 10D according to an embodiment of the present disclosure.

Referring to FIG. 11, a network of electrodes are provided including a plurality of first electrodes 910-1 and 910-2 arranged in the vertical direction, and a plurality of second electrodes 920-1 and 92-=2 arranged in the horizontal direction. The plurality of first electrodes 910-1 and 910-2 are wider and occupy larger areas than the plurality of second electrodes 920-1 and 920-2, which are narrower than the first electrodes 910-1 and 910-2. However, this arrangement of FIG. 11 is for illustration purposes and should not be considered as limiting.

Referring again to FIG. 11, an input point 1100 of a conductive tip 110 of the input device 100 (not shown) is on the first electrode 910-1 of the plurality of electrodes 910-1 and 910-2 in the vertical direction, and is between the plurality of second electrodes 920-1 and 920-2 in the horizontal direction.

Figure 12:
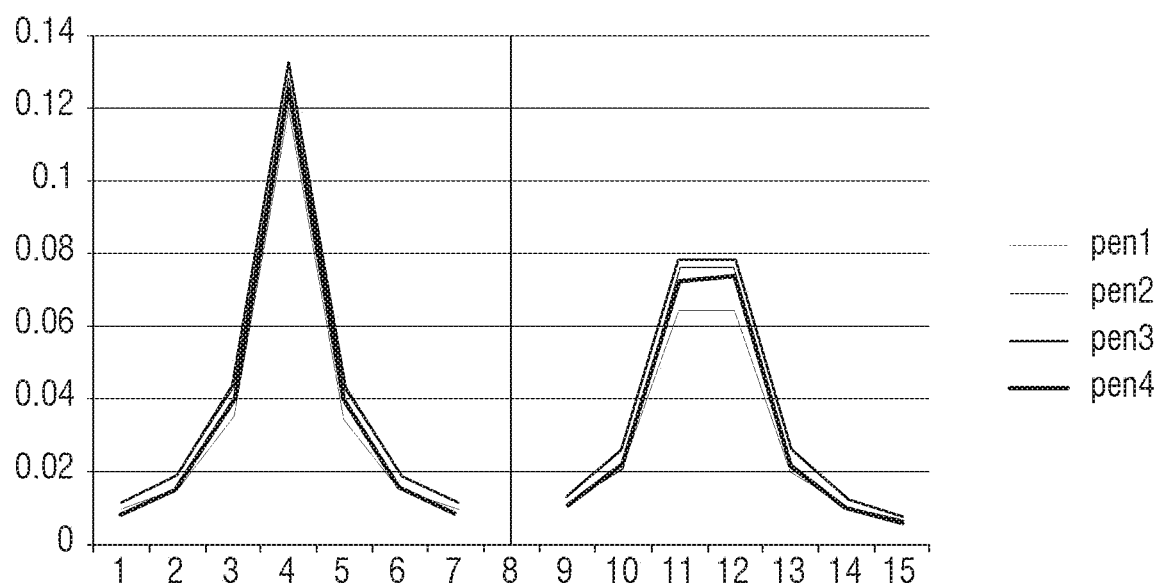
FIG. 12 is a graph illustrating a signal characteristic of electrodes when a touch screen is touched as shown in FIG. 11 according to an embodiment of the present disclosure.

FIG. 12 is a graph illustrating a transmission and reception characteristic of each of input devices (for example, pens) in response to the input devices touching a touch point as shown in FIG. 11 according to an embodiment of the present disclosure.

Referring to FIG. 12, the horizontal axis denotes a channel number and the vertical axis denotes an intensity of a signal. The vertical axis may denote other characteristics corresponding to the intensity of the signal (for example, coupling capacitance, etc.).

FIG. 12 is a graph showing a signal characteristic detected using the plurality of first electrodes denoted by numbers 1 to 7 on the horizontal axis, and showing a signal characteristic detected using the plurality of second electrodes denoted by numbers 8 to 15 on the horizontal axis.

Referring to FIG. 12, numbers 1 to 7 on the horizontal axis of FIG. 12 illustrate a result of detection using seven electrodes (hereinafter, referred to as channels 1-7) of the first electrode group (for example 910-n), and numbers 8 to 15 on the horizontal axis of FIG. 12 illustrate a result of detection using seven electrodes (hereinafter, referred to as channels 9-15) of the second electrode group (for example 920-n). However, the number of electrodes used for detecting a response signal may be arbitrarily set, and embodiments are not limited to the number shown.

Since the conductive tip 110 is located over the one first electrode 910-1 as shown in FIG. 11, a peak value (for example, 0.13) is detected at channel 4 corresponding to the electrode 910-1. In the second electrode group, a similar intensity of signal may be detected at channels 11 and 12 since the conductive tip 110 is located between second electrodes 920-1 and 920-2 as shown in FIG. 11.

In response to the result shown in FIG. 12 being obtained, the processor 220 of the electronic device 200 may determine a point where the one first electrode 910-1 intersects with the two second electrodes 920-1 and 920-2 as the input point.

The processor 220 may also determine a tilt or similar characteristic of the input device 100 by monitoring a change in the graph of FIG. 12.

Figure 13:
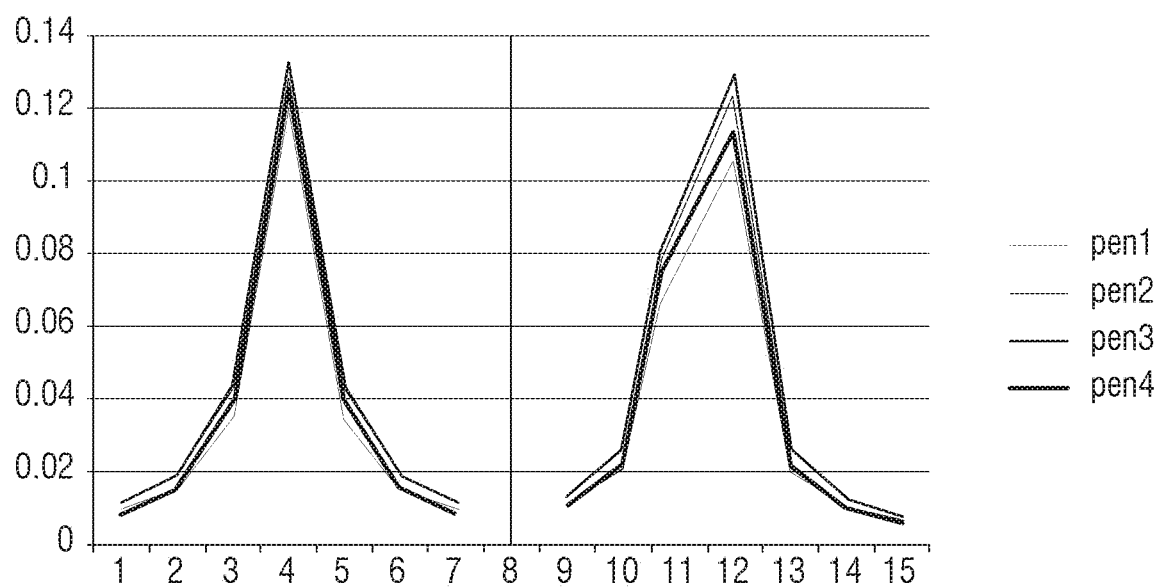
FIG. 13 is a graph illustrating a signal characteristic which changes as an input device is tilted according to an embodiment of the present disclosure.

For example, in response to the input device 100 being tilted toward the neighboring second electrode 920-2 by more than a predetermined angle in the example of FIG. 11, the graph of FIG. 12 may be changed to a graph of FIG. 13.

FIG. 13 is a graph illustrating a signal characteristic which changes as an input device is tilted according to an embodiment of the present disclosure.

Since the input device 100 is tilted only toward the second electrode 920-2, the intensity of the signal detected at the first electrode is not greatly changed.

Accordingly, as shown in numbers 1 to 7 on the horizontal axis of FIG. 13, a characteristic graph of a signal detected at the transmission channels (channels 1 to 7) is almost identical to that of FIG. 12. However, as shown by numbers 8 to 15 on the horizontal axis of FIG. 13, a characteristic graph of a signal detected at the reception channels (channels 9 to 15) is changed. Specifically, a signal detected at the second electrode 920-2 toward which the input device 100 is tilted (that is, a signal of channel 12) is detected as a peak value.

When distribution of signals of the channels is asymmetric with reference to the peak value, the processor 220 may determine that the input device 100 is tilted. In this case, the processor 220 may not determine the location of the channel in which the peak value is detected as the input point, and compensate the input point and thus determine a neighboring area of the channel of the peak value, that is, a point where channel 4 intersects with channels 11 and 12, as the input point.

In addition, the processor 220 may determine that the input device 100 is tilted toward the second electrode 920-2 by considering that the intensities of the signals are symmetrically distributed with reference to the peak value in the transmission channels, whereas a peak value is detected at channel 12 of the reception channels and the intensities of the signals are asymmetrically distributed. In addition, the processor 220 may determine a tilt angle of the input device 100 based on the intensity of the signal at channel 12.

In the above-described method, the processor 220 may detect the tilt characteristic and accordingly compensate the input point.

The electronic device 200 may also perform various interactions according to the tilt characteristic of the input device 100. Hereinafter, examples of methods of interacting according to a change in the tilt of the input device 100 will be described in greater detail.

Figure 14:
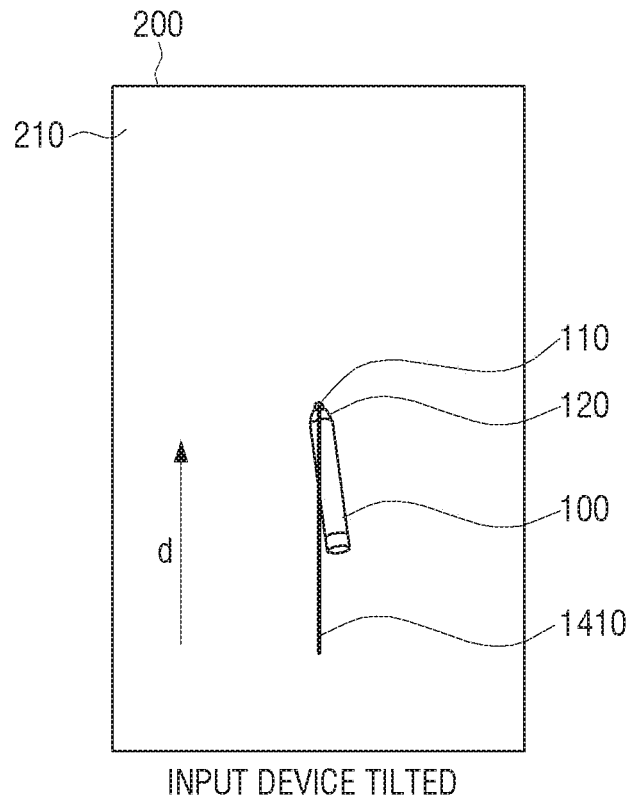
FIGS. 14 to 19 are views illustrating examples of various interactions corresponding to tilt characteristics of an input device according to an embodiment of the present disclosure.
Figure 14:
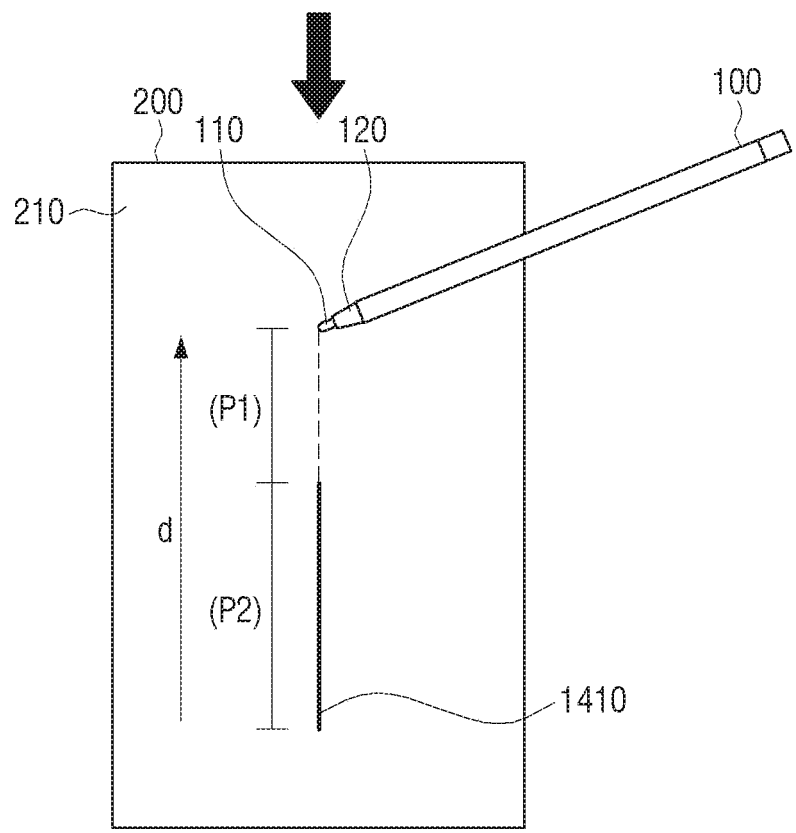

FIG. 14 illustrates an example of a method of changing a shape of a writing trace according to a tilt characteristic according to an embodiment of the present disclosure.

Referring to FIG. 14, a process in which a user touches a touch screen 210 of an electronic device 200 with a conductive tip 110 and connection part 120 of an input device 100 and then draws a writing trace by moving the input device 100 is illustrated.

In response to the user standing the input device 100 on the touch screen 210 almost upright, and moving the input device 100 in the direction of d, the processor 220 draws a writing trace 1410 along a moving path of the input device 100. While there is no change in the tilt, the writing trace 1410 is displayed as a solid line.

In response to the user tilting the input device 100 in one direction beyond an allowable range in the middle of drawing as shown in FIG. 14, the processor 220 detects a tilt characteristic. The processor 220 may change the shape of the writing trace 1410 from the solid line to a dashed line from a point where the input device 100 is tilted beyond the allowable range. The writing trace 1410 is divided into a solid line section P2 and a dashed line section P1. Thereafter, in response to the user standing the input device 100 on the touch screen 210 upright again, the shape of the writing trace 1410 may be changed from the dashed line back to the solid line. The user can easily adjust the shape of the writing trace 1410 by simply tilting or standing the input device 100 without any other particular manipulation.

In FIG. 14, the solid line is changed to the dashed line according to the tilt. However, the shape of the writing trace 1410 may also be changed to various shapes according to a degree of a tilt angle. For example, the processor 220 may display the writing trace 1410 in a section in which the input device 100 is tilted by about 10-30 degrees in a dash-dot line, display the writing trace 1410 in a section in which the input device 100 is tilted by about 31-45 degrees in a dash-dot-dot line, and display the writing trace 1410 in a section in which the input device 100 is tilted by more than 46 degrees in a dashed line as shown in FIG. 14. The range of the tilt angle and the shape of the writing trace corresponding thereto may be pre-set and stored in an internal memory of the electronic device 200.

In addition to the shape of the writing trace, options such as thickness, brightness, color, chroma, size, etc. of the writing trace and a function matching the input device 100 may be changed according to the tilt characteristic.

Figure 15:
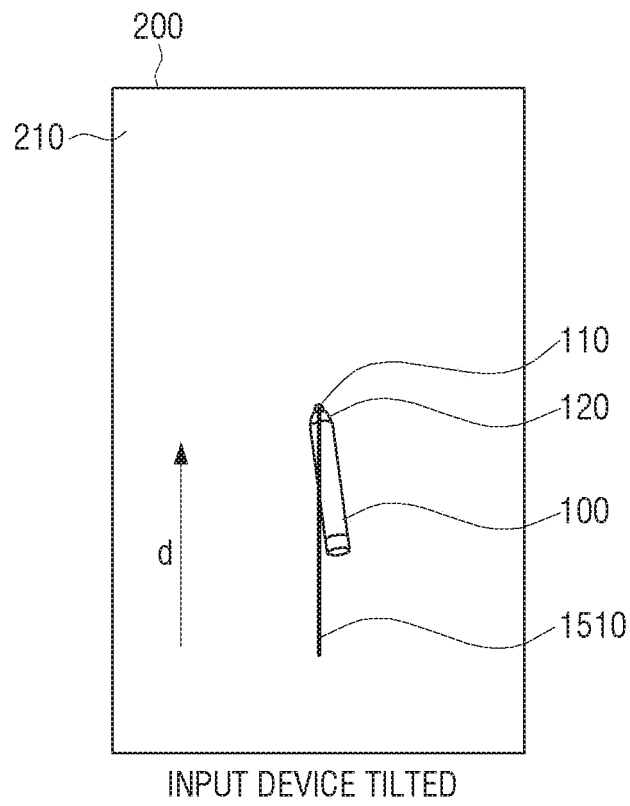
Figure 15:
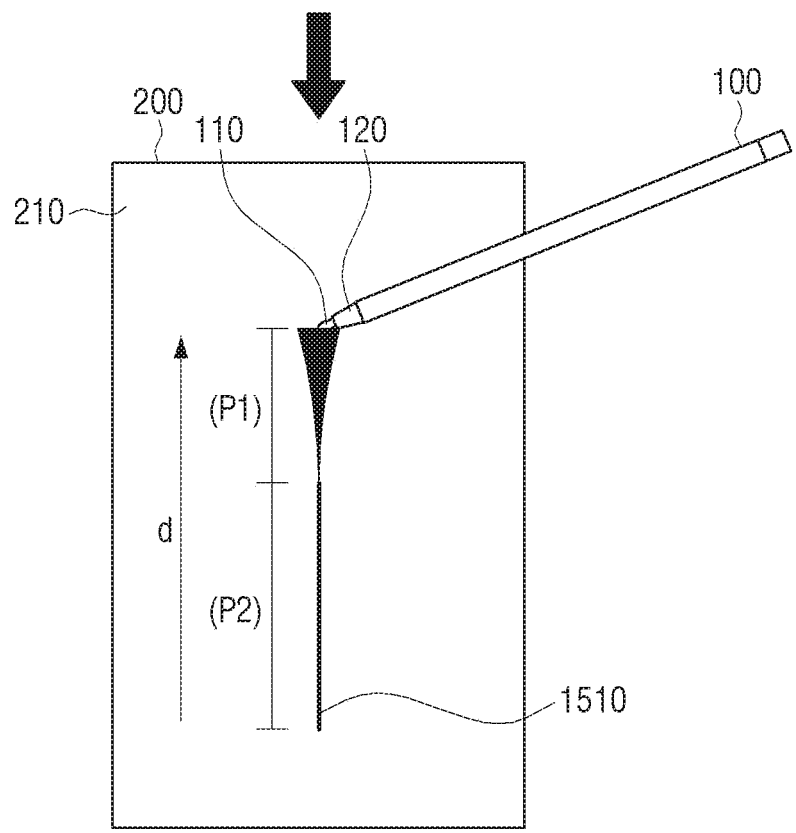

FIG. 15 illustrates an example of a method of changing a thickness of a writing trace according to a tilt characteristic according to an embodiment of the present disclosure.

Referring to FIG. 15, in response to the user standing the input device 100 with a conductive tip 110 and connection part 120 on the touch screen 210 of an electronic device 200 almost upright, and moving the input device 100 in the direction of d, the processor 220 draws a writing trace 1510 along a movement path of the input device 100. While there is no change in the tilt, the writing trace 1510 is displayed in a solid line with a default thickness.

Thereafter, in response to the user tilting the input device 100 in one direction beyond an allowable range, the processor 220 changes the thickness of the writing trace 1510 to be thicker to correspond to a tilt angle. As shown in FIG. 15, the processor 220 may display the writing trace 1510 to become evenly thicker in both side directions with reference to an advancing direction of the writing trace 1510. Alternatively, the processor 220 may increase the thickness of the writing trace 1510 in a different direction according to a tilt direction of the input device 100. For example, in response to the input device 100 being tilted in the right side direction as shown in FIG. 15, the writing trace 1510 becomes thicker in the right side direction with reference to the advancing direction of the writing trace 1510. Accordingly, the writing trace 1510 may be divided into a default line section P2 and a thick line section P1.

In addition, the various options of the writing trace may be changed to correspond to the tilt according to user settings or a unique setting state of the electronic device.

Figure 16:
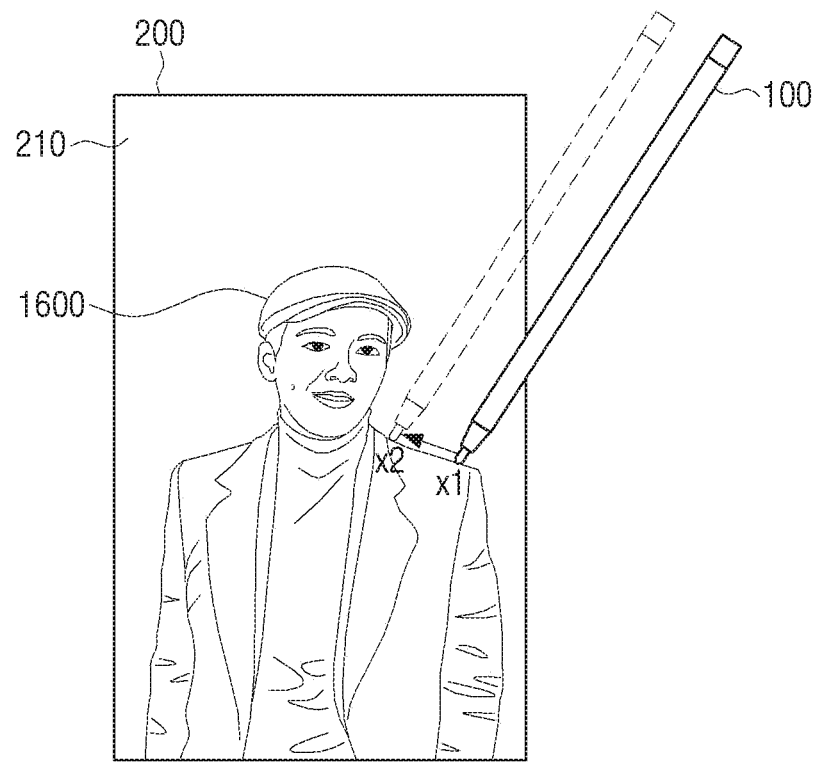
Figure 16:
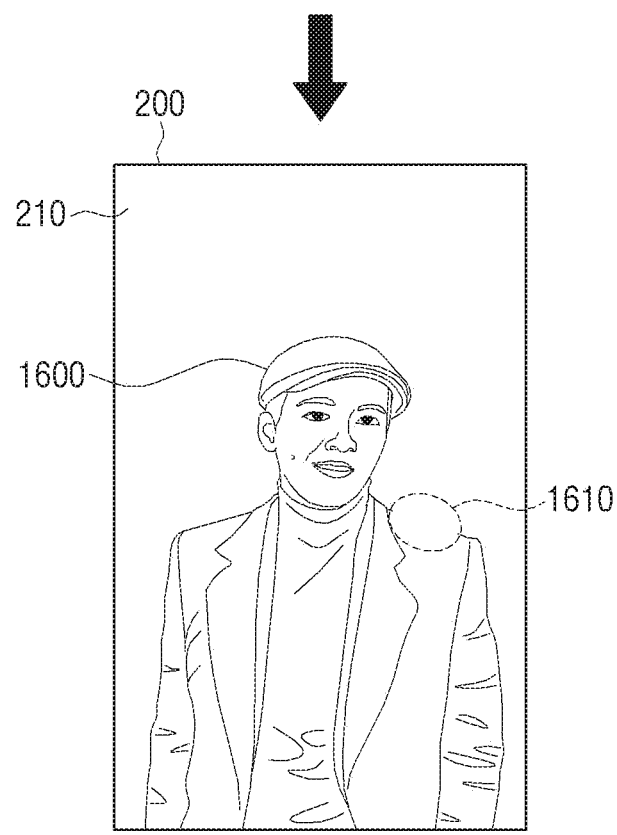

FIG. 16 illustrates a case in which a different function of an input device matches a tilt characteristic according to an embodiment of the present disclosure.

Referring to FIG. 16, in response to the user touching or hovering over the touch screen 210 of an electronic device 200 with the input device 100 being tilted within an allowable range or standing almost upright, and moving the input device 100, the processor 220 may draw a writing trace by executing a drawing function. In this state, in response to the user tilting the input device 100, the processor 220 may change the drawing function to a delete function. FIG. 16 illustrates a case in which the user touches one point x1 on an object 1600 with the input device 100 being tilted, and then drags to another point x2. The processor 220 deletes a part of the object displayed in a moving path of the input device 100. Accordingly, the part 1610 of the object 1600 is deleted as shown in FIG. 16.

Referring to FIG. 16, the delete function is executed regarding a picture. However, the delete function may be executed regarding a text or a photo. In addition, in response to the user touching or dragging an icon or a folder with the input device 100 being tilted, the corresponding icon or folder may be deleted.

Figure 17:
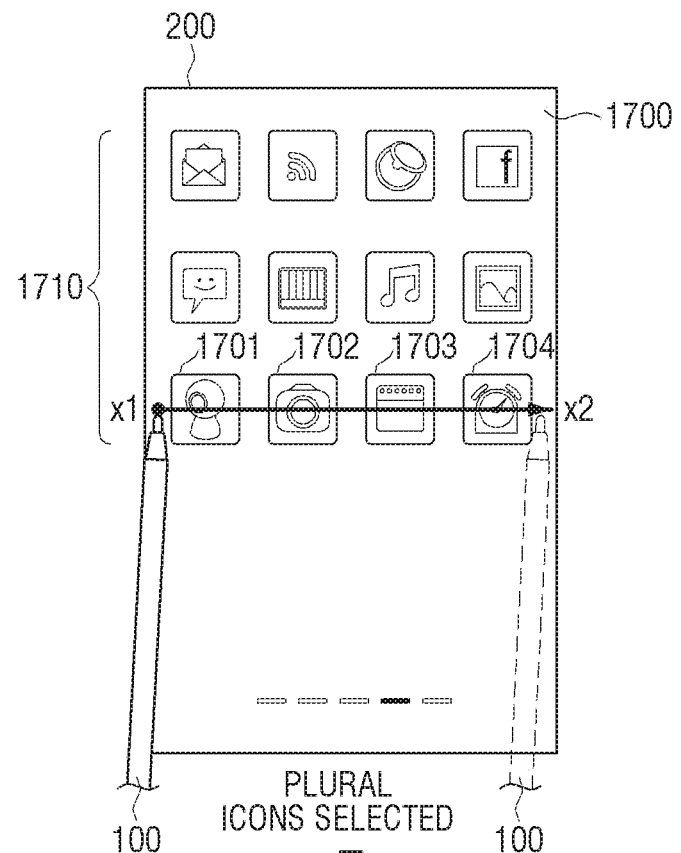
Figure 17:
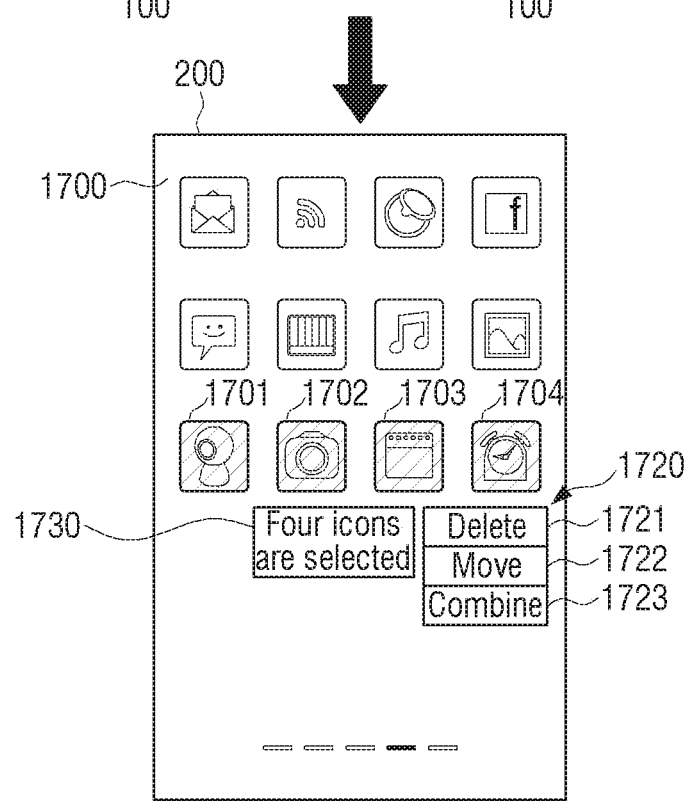

FIG. 17 is a view to illustrate another example of a method of using an input device according to an embodiment of the present disclosure.

Referring to FIG. 17, an electronic device 200 may display at least one icon 1710 on a main screen 1700. The main screen 1700 refers to a screen which is basically displayed on the electronic device 200. Alternatively, the main screen 1700 may be named a home screen, an icon arrangement screen, a basic screen, an initial screen, etc.

In response to the user touching an icon with the input device 100 standing upright, the processor 220 may execute a function corresponding to the touched icon. In response to the user touching an icon or dragging on a plurality of icons with the input device 100 being tilted, the processor 220 may perform a different operation.

FIG. 17 illustrates an operation of dragging a plurality of icons 1701, 1702, 1703 and 1704 by moving from a point x1 to a point x2 with the input device 100 being tilted. In response to this operation being detected, the processor 220 may determine that the corresponding icons 1701, 1702, 1703 and 1704 are collectively selected, and display an edit menu 1720 and a notification message 1730 regarding the corresponding icons 1701, 1702, 1703 and 1704 as shown in FIG. 17.

In addition, the processor 220 may highlight or shade the selected icons 1701, 1702, 1703 and 1704 to be distinguished from the other icons. The notification message 1730 informs the user that four icons in total are selected. However, this should not be considered as limiting. Names or other information regarding applications matching the selected icons may also be displayed.

The edit menu 1720 may display a delete menu 1721 to delete the selected icons 1701, 1702, 1703 and 1704, a move menu 1722 to move a display location, and a combine menu 1723 to combine the selected icons 1701, 1702, 1703 and 1704 in a single folder. In response to the user selecting one menu, the processor 220 may collectively process the selected icons according to the menu selected by the user.

Figure 18:
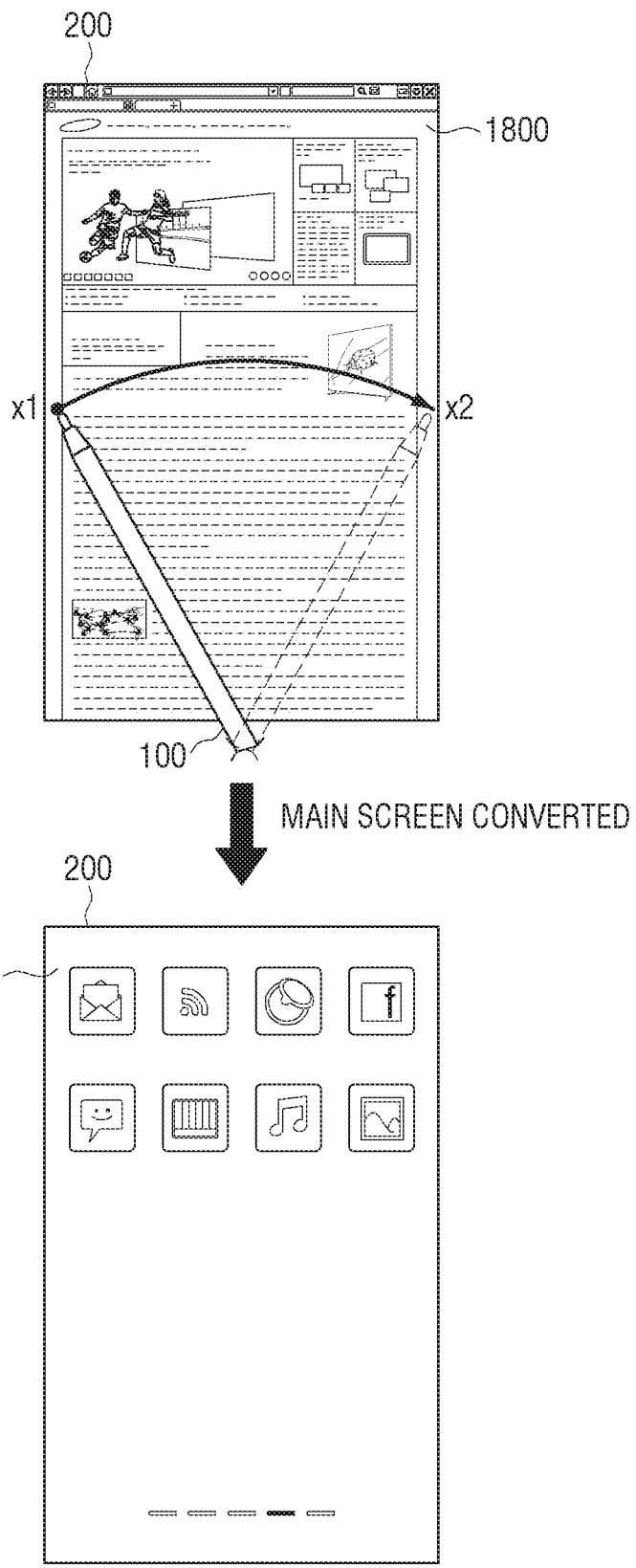

FIG. 18 is a view to illustrate another example of a method of using an input device according to an embodiment of the present disclosure.

Referring to FIG. 18, an electronic device 200 may display a certain screen 1800. In FIG. 18, a web browser screen 1800 is illustrated. However, this should not be considered as limiting. A content reproduction screen or various application execution screens may also be displayed.

In this state, in response to the user touching a certain point x1 on the screen 1800 with the input device 100 being tilted, and then dragging to another point x2 by more than a predetermined distance, the processor 220 may close the currently displayed screen 1800 and convert the screen into a main screen 1700 as shown in FIG. 18.

In response to the user touching the screen 1800 with the input device 100 standing upright, the processor 220 may display another screen linked with a text or a picture of the touched point, or draw a writing trace on the screen 1800.

As described above, the electronic device can perform various interactions by matching a function different from a basic function with a tilt state of the input device.

Figure 19:
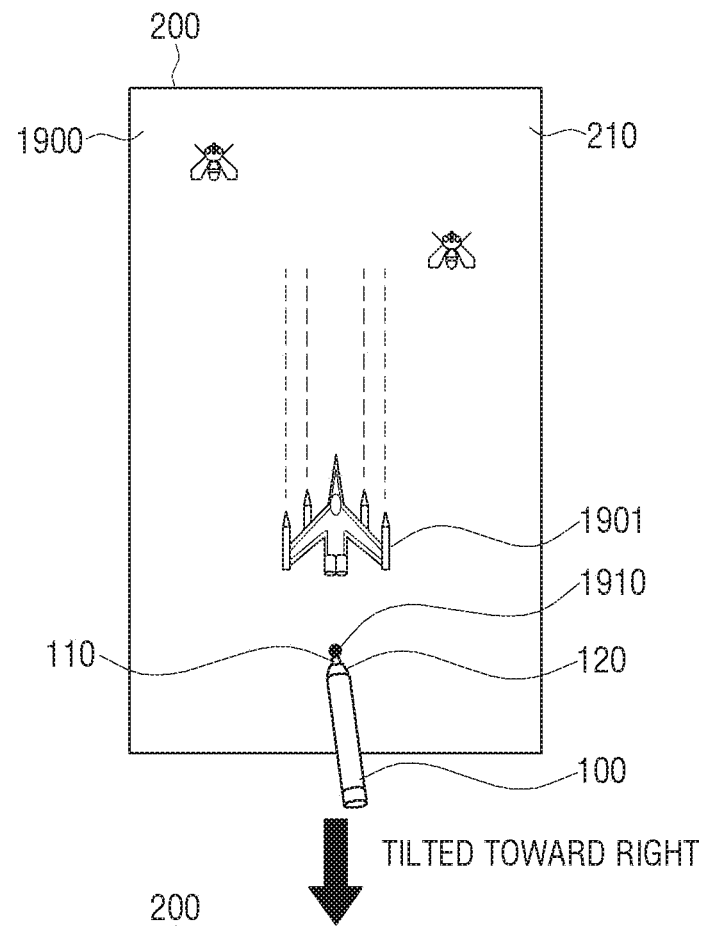
Figure 19:
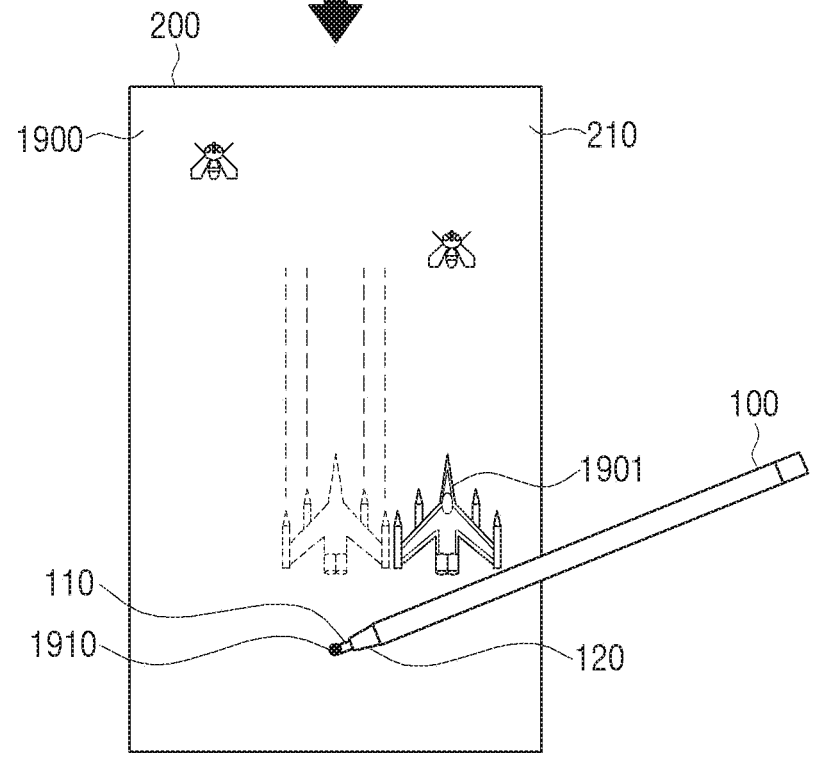

FIG. 19 is a view to illustrate another example of a method of using an input device according to an embodiment of the present disclosure.

Referring to FIG. 19, an electronic device 200 may display a game screen 1900. As shown in FIG. 19, an object 1901 may be included in the game screen 1900.

In response to an input device 100 with a conductive tip 110 and connection part 120 touching a certain point 1910 of the touch screen 210 and being tilted in a certain direction while the object 1901 is displayed, the processor 220 may move the object 1901 according to a tilt direction and a tilt angle of the tilt. A moving speed of the object 1901 may vary according to the degree of the tilt angle. A greater tilt angle may result in the object 1901 moving at a greater speed, and a lesser tilt angle may result in the object 1901 moving at a lower speed, stopping or even reversing direction.

FIG. 19 illustrates the input device 100 which is tilted in the right side direction. The processor 220 moves the object 1901 to the right while the input device 100 is being tilted. In response to the tilt of the input device 100 being returned to an allowable range, the processor 220 may stop moving the object 1901.

According to the embodiment of FIG. 19, the user can perform various interactions using the input device 100 like a joystick according to an embodiment of the present disclosure.

In FIG. 19, the game screen is illustrated and explained. However, the embodiments of the present disclosure are not limited to a game. For example, the processor 220 may display a cursor on the touch screen 210 and move the location of the cursor according to a tilt direction and a tilt angle of the input device 100. In addition, the processor 220 may not normally display the cursor and may display the cursor in response to the input device 100 touching the same point on the touch screen 210 for more than a predetermined time. After displaying the cursor, the processor 220 may move the cursor according to the tilt characteristic of the input device 100.

As described above, various options may be set and/or preset regarding the tilt of the input device 100. These options may be set as default by a manufacturer of the electronic device 200 or by a program developer, or may be arbitrarily set by the user prior to use or when the electronic device is in use.

FIG. 20 illustrates an example of a user interface (UI) configuration for a user to set tilt options according to an embodiment of the present disclosure.

Referring to FIG. 20, in response to an event, such as an event in which the input device 100 is withdrawn from a recess provided on the electronic device 200, an event in which the electronic device 200 is turned on, or an event in which the user selects an environment setting menu being generated, the electronic device 200 may display a UI 2000.

The UI 2000 displays various tilt options 2010, including a none menu 2011. In response to the none menu 2011 being selected, the processor 220 may not use the tilt characteristic for interactions and use the tilt characteristic only for compensation of an input point. The other menus 2012 (for setting thickness), 2013 (for setting shape), 2014 (for setting chroma), 2015 (for setting color), 2016 (for setting brightness), and 2017 (for setting function) may be selected by the user. In this case, the processor 220 may perform an operation corresponding to a selected menu in response to the tilt characteristic being detected.

In response to the user selecting the function menu 2017 for example, the processor 220 may display a UI 2020 as shown in FIG. 20. The UI 2020 may display various functions 2021 (delete), 2022 (copy), 2023 (fill), 2024 (turn on/off), 2025 (joystick), 2026 (capture screen), and 2027

(convert into main screen) which can be matched in response to the input device 100 being tilted.

In response to the delete function 2021 being selected, objects (for example, icons, pictures, texts, photos, etc.) which are touched with the input device 100 being tilted may be deleted as explained above with reference to FIG. 16. In response to the copy function 2022 being selected, the objects which are touched with the input device 100 being tilted are copied. In response to the fill function 2023 being selected, and the user touching or dragging with the input device 100 being tilted within a closed curve drawn by the input device 100, an area in the closed curve may be filled with color set by the user. In response to the turn on/off function 2024 being selected, and the user dragging on the touch screen 210 with the input device 100 being tilted by more than a predetermined distance in the middle of using the electronic device 200, the touch screen 210 or the electronic device 200 may be turned off or inactivated. In response to the joystick function 2025 being selected, the input device 100 may be used like a joystick as shown in FIG. 19. In response to the screen capture function 2026 being selected, and the user dragging on a certain screen displayed on the touch screen 210 with the input device 100 being titled by more than a predetermined distance, the currently displayed screen is captured and stored in the internal memory of the electronic device 200. In response to the main screen conversion function 2027 being selected, the screen may be easily converted into the main screen as shown in FIG. 18.

In FIG. 20, various functions and options which can be set according to the tilt characteristic of the input device have been described. However, this should not be considered as limiting. Accordingly, other functions and options which are not mentioned may be set to match with the tilt characteristic. In addition, the configuration and shape of the UI for explaining these options are not limited to those of FIG. 20, and may be changed variously.

Figure 21:
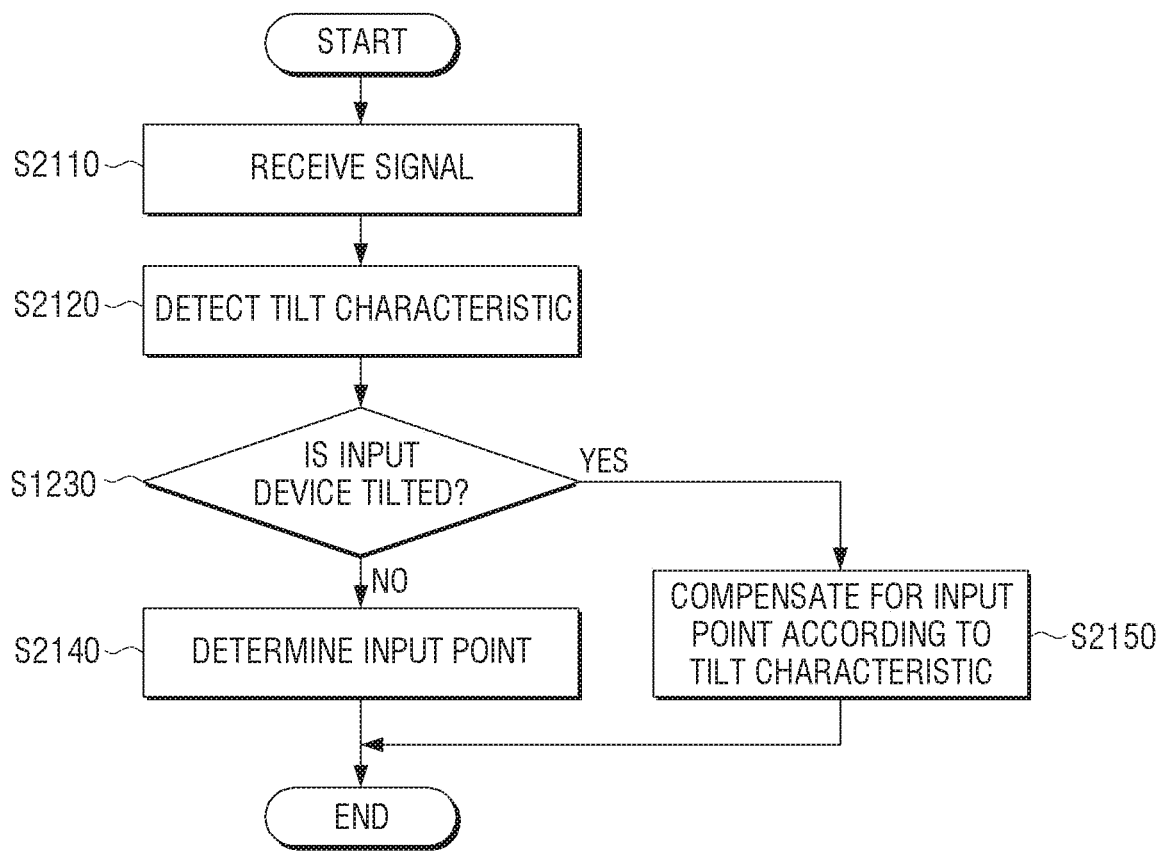
FIG. 21 is a flowchart illustrating a control method of an electronic device according to an embodiment of the present disclosure.

FIG. 21 is a flowchart illustrating a control method of an electronic device according to an embodiment of the present disclosure.

Referring to FIG. 21, an electronic device 200 may receive a signal generated in an input device 100 touching or approaching a touch screen thereof, that is, a response signal in operation S2110. To receive signals, the electronic device may apply driving signals to the electrodes in the touch screen as described above. The operation of applying the driving signals and the operation of receiving the response signals may be alternately repeated.

In response to the response signals being received by the plurality of electrodes, the electronic device may analyze the signals received at the electrodes, and detect a tilt characteristic of the input device in operation S2120. As described above, the electronic device may detect the tilt characteristic based on the intensity of the signal received at each of the electrodes. The method for detecting the tilt characteristic has been described above in detail.

The electronic device may determine an input point of the input device based on the tilt characteristic. Specifically, in response to determining that the input device is not tilted in operation S2130, the input point may be determined based on a signal characteristic of each of the electrodes in operation S2140. In response to determining that the input device is tilted in operation S2130, the input point is compensated for according to the tilt characteristic in operation S2150. Specifically, a point which is shifted from a point at which a peak value of the received signals is detected in the opposite direction to the tilt direction of the input device may be determined as the input point. A shift distance may be appropriately determined considering the distribution of signal intensities.

In FIG. 21, the control method including the operation of determining the input point using the tilt characteristic has been described. However, according to an embodiment of the present disclosure, the electronic device may use the tilt characteristic as control signals for various interactions.

Specifically, the control method of the electronic device according to another embodiment of the present disclosure may further include, in response to the tilt angle of the input device being within the predetermined allowable range, performing a first control operation, and in response to the tilt angle of the input device being outside of the allowable range, performing a second control operation which is different from the first control operation. Examples of each of the control operations have been described with reference to FIGS. 14 to 19.

For example, the control method may further include displaying a writing trace according to a location of the input device, and changing at least one of thickness, brightness, color, chroma, size, and shape of the writing trace according to the tilt angle of the input device.

In another example, the control method may further include, in response to an object being displayed on the touch screen and the input device touching one point of the touch screen and being tilted, moving the object according to the tilt direction and the tilt angle of the input device.

In addition, various steps may be added to the control method to perform the operations described in the above-described various embodiments of the present disclosure, or various steps may be changed, arranged or omitted to achieve the above-described various embodiments of the present disclosure.

The various control methods described above may be performed by the electronic device having the configuration of FIG. 8 described above. However, this should not be considered as limiting. The configuration of the electronic device may be changed or an element may be added according to the type of the electronic device, a use field, and other conditions. For example, a communicating means for communicating in various communication methods such as Wi-Fi, Bluetooth, near field communication (NFC), etc., a video processor for processing video signals, an audio processor for processing audio signals, a graphic processing unit (GPU), a microphone, a camera, a speaker, storage, various interfaces, etc. may be added. In addition, various memories such as a random access memory (RAM) or a read only memory (ROM), a buffer, a register, etc., which can be used by the processor 220, may be added.

The storage may store various programs and data necessary for the operations of the electronic device 200.

Figure 22:
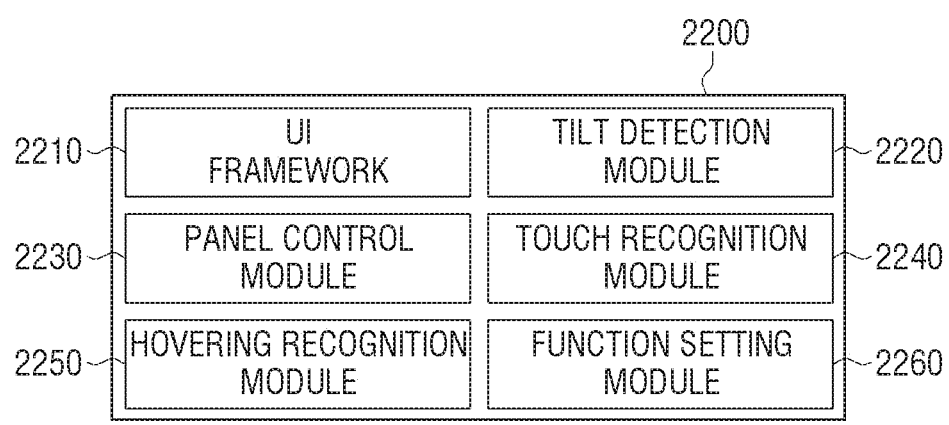
FIG. 22 is a block diagram illustrating an example of a software structure used in an electronic device according to an embodiment of the present disclosure.

FIG. 22 is a block diagram illustrating an example of a configuration of a variety of software installed in a storage mounted in the electronic device according to an embodiment of the present disclosure.

Referring to FIG. 22, the storage 2200 may store a variety of software in addition to an operating system (O/S) or a kernel. Specifically, the storage 2200 may store a UI framework 2210, a tilt detection module 2220, a panel control module 2230, a touch recognition module 2240, a hovering recognition module 2250, a function setting module 2260, etc.

The UI framework 2210 is a module for generating various UIs. The UI framework 2210 may include an image compositor module to configure various objects in a screen, a coordinates compositor module to calculate coordinates for displaying an object, a rendering module to render the configured object on the calculated coordinates, and a two-dimensional (2D)/three-dimensional (3D) toolkit to provide a tool for configuring a UI in the form of 2D or 3D.

In response to the input device touching a surface of the touch screen 210 or dragging, the UI framework 2210 may draw various graphic lines, that is, a writing trace, according to movement of the input device. In addition, the UI framework 2210 may generate various UIs as described above, and may change a display state of the writing trace according to a tilt of the input device.

The tilt detection module 2220 is software which analyzes characteristics of signals received at the electrodes in the touch screen 210, and detects characteristics such as a tilt direction, a tilt angle, etc. of the input device 100. The tilt characteristic detected by the tilt detection module 2220 may be provided to the touch recognition module 2240 and the hovering recognition module 2250.

The touch recognition module 2240 is a module for recognizing a point at which user's hand or the input device touches the touch screen 210. The touch recognition module 2240 may analyze signals transmitted from the electrodes in the touch screen 210, and detect coordinates of the touch point, that is, an input point. In addition, in response to the tilt characteristic being provided by the tilt detection module 2220, the touch recognition module 2240 may compensate the input point according to the tilt characteristic.

The hovering recognition module 2250 is a module for recognizing a point on the touch screen 210 over which the user's hand or the input device hovers, that is, the input point. The hovering recognition module 2250 may also compensate the input point considering the tilt characteristic. The hovering recognition module 2250 and the touch recognition module 2240 may be implemented as a single module or may be implemented as different modules.

The panel control module 2230 is a software module for controlling the panel controller 930 in the touch screen 210. The processor 220 may control the panel controller 930 to apply a driving signal and detect a response signal alternately as described above, under control of the panel control module 2230.

The function setting module 2260 is a software module for setting various options or functions corresponding to a tilt of the input device. As described in the above-described various embodiments of the present disclosure, the user may set the functions in various ways. The function setting module 2260 may match the function set by the user with a tilt direction and/or a tilt angle, and store the matched information in the storage 2200.

The processor 220 may perform the above-described various operations by executing the software modules stored in the storage 2200. However, this should not be considered as limiting. For example, the processor 220 may be implemented in the form of a system on chip (SoC) or an integrated circuit (IC) having software modules embedded therein, and may be implemented in other forms.

The software structure illustrated in FIG. 22 is merely an example and the present disclosure is not limited to this. Accordingly, some of the modules may be omitted or changed, or a new module may be added when necessary. For example, various programs such as a multimedia framework for processing multimedia, a sensing module for analyzing signals sensed by various sensors, a messaging module such as a messenger program, a short message service (SMS) and multimedia message service (MMS) program, an email program, etc., a call info aggregator program module, a VoIP module, a web browser module, etc. may be additionally provided in the storage 2200.

In addition, a program for performing the above-described control method may be stored in various recording media in addition to the storage 2200 and mounted in the electronic device.

For example, a non-transitory computer readable medium can be provided which stores the program for performing the operations of receiving a signal which is generated in an input device touching or approaching a touch screen of the electronic device and in response to the signal being received at a plurality of electrodes in the electrode unit, analyzing signals received through the plurality of electrodes, detecting a tilt characteristic of the input device, and compensating an input point on the touch screen based on the tilt characteristic.

The non-transitory computer readable medium refers to a medium that stores data semi-permanently rather than storing data for a short time, such as a register, a cache, a memory, or etc., and is readable by an apparatus. Specifically, the above-described various applications or programs may be stored in the non-transitory computer readable medium such as a compact disc (CD), a digital versatile disc (DVD), a hard disk, a Blu-ray disk, a universal serial bus (USB), a memory card, a ROM or etc.

In addition, in the above-described embodiments of the present disclosure, the tilt characteristic of the input device is detected and then the input point is adaptively compensated according to the tilt characteristic. However, the input point may be compensated using a pre-created correction Table or Tables.

Figure 23:
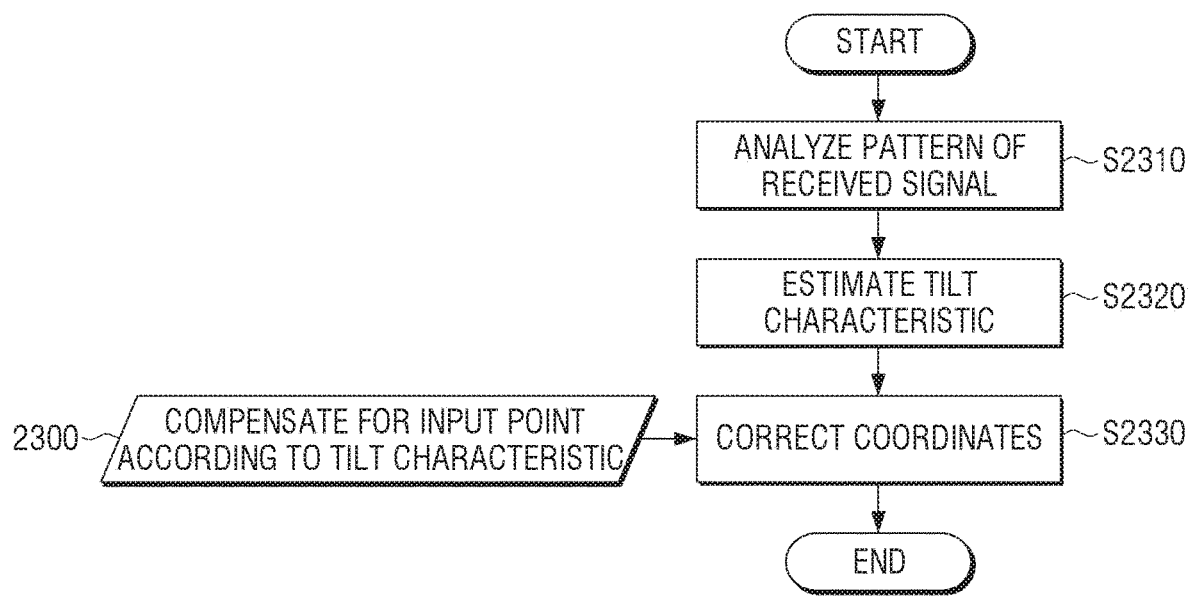
FIGS. 23 and 24 are flowcharts illustrating a method for compensating an input point using correction tables according to an embodiment of the present disclosure.
Figure 24:
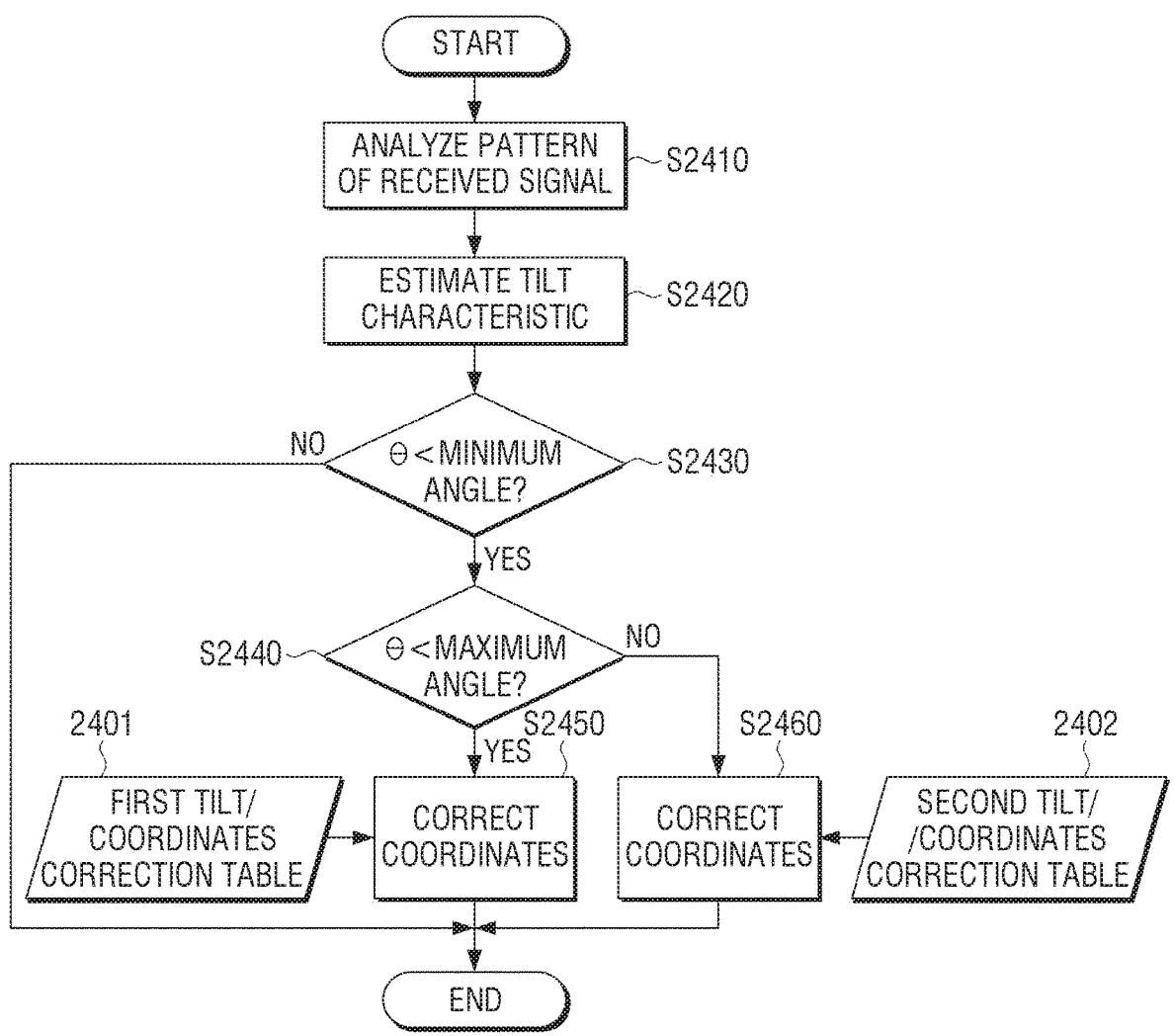

FIGS. 23 and 24 are flowcharts illustrating a method for compensating an input point using a correction table according to an embodiment of the present disclosure.

Referring to FIG. 23, in response to a signal of the input device 100 being received, the electronic device 200 analyzes a pattern of the received signal in operation S2310. Specifically, the electronic device 200 may analyze an intensity of a signal received at each of the electrodes and distributions of the intensities of the signals as described above. The electronic device 200 may estimate a tilt direction and/or a tilt angle of the input device 100 based on the result of the analysis of operation S2320. The electronic device 200 corrects coordinates of an input point of the input device 100 by referring to a pre-stored tilt/coordinates correction Table 2300 in operation S2330.

The correction Table 2300 may store tilt characteristics such as a tilt angle and a tilt direction, and corresponding coordinates compensation values, which are matched with each other. The correction Table 2300 may be pre-created and stored in the storage 2200. A manufacturer or seller of the electronic device 200, a service provider, and other content providers may conduct experiments on the input device repeatedly with various directions, angles, and types of the input device, create the correction Table 2300, and then provide the correction Table 2300 or Table 2300 updates to the electronic device 200.

In FIG. 23, one correction Table 2300 is used. However, a plurality of correction Tables 2300 may be used.

Referring to FIG. 24, the electronic device 200 may analyze a pattern of a signal received from the input device 100 and analyze a tilt angle and/or a tilt direction of the input device 100 in operations S2410 and S2420. The electronic device 200 disregards a tilt in response to the estimated tilt angle being less than a minimum angle in operation S2430. In response to the tilt angle being greater than or equal to the minimum angle and less than a maximum angle, the electronic device 200 may correct the coordinates of an input point using a pre-set first correction Table 2401 in operations S2440 and S2450.

In addition, in response to the tilt angle being greater than or equal to the maximum angle, the electronic device 200 may correct the coordinates of the input point using a pre-set second correction Table 2402 in operations S2440 and S2460.

The minimum angle and the maximum angle may vary according to the shape of the connection part 120 of the input device 100. The minimum angle and the maximum angle may be determined based on a section in which a relationship between a tilt characteristic and a coordinates shift distance are linearly calculated. For example, in response to the input device being tilted by less than 60 degrees, the shift distance may be linearly changed according to the tilt angle, and in response to the input device being tilted by more than 60 degrees, the shift distance may be nonlinearly changed. In this case, different correction Tables 2401 and 2402 may be created with reference to 60 degrees and may be used. In FIG. 24, two correction Tables are used, but the number of correction Tables may increase according to a variation of the embodiment of the present disclosure.

In the above-described embodiments of the present disclosure, the input device 100 includes the conductive tip, the resonant circuit unit, the connection part, etc. However, various additional elements may be included in the input device 100. For example, a pen pressure module may be added to the input device 100 as described above. In addition, a button which can be slide or otherwise adjusted by a user's hand to change capacitance, an on/off button to turn on/off the input device 100, etc. may be added to the input device 100.

In addition, the input device may be implemented as an active type input device which is operated with its own battery.

The various embodiments of the present disclosure have been individually explained, but are not necessarily implemented independently. The configuration and operations of each of the various embodiments may be implemented in combination with at least one of other various embodiments.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. An input device comprising:
a conductive tip formed at one end of the input device;
a resonant circuit configured to:
generate a response signal corresponding to a signal received by the conductive tip, and
output the response signal through the conductive tip; and
a connection part formed between the conductive tip and a body of the input device to enclose a periphery of the conductive tip so as to have a part of the conductive tip exposed from one end of the input device,
wherein the connection part comprises a metal member having a larger cross-section area than a cross-section area of the conductive tip, and
wherein the resonant circuit generates the response signal used to identify a tilt characteristic of the input device, based on a first electrode of an external device coupling with the conductive tip and a second electrode of the external device coupling with the metal member.

2. The input device of claim 1, wherein the metal member has a conical shape such that the cross-section area of the metal member gradually increases from a point nearest the exposed conductive tip to a point nearest the body, along an axis of the member.

3. The input device of claim 1, wherein the metal member comprises:
a conical part, a cross-section area of which gradually increases from a point nearest the exposed conductive tip to a point nearest the body, along an axis of the member; and
a cylindrical part, a cross-section area of which is uniform.

4. The input device of claim 1,
wherein the metal member has a conical shape such that the cross-section area of the metal member gradually increases from a point nearest the exposed conductive tip to a point nearest the body, along an axis of the member, and
wherein the connection part comprises a nonconductive member of a cylindrical shape, which is in contact with the metal member and a cross-section area of which is uniform.

5. The input device of claim 1, wherein the body of the input device comprises:
a case formed of a conductive material; and
an insulator configured to insulate the connection part from the case.

6. The input device of claim 1, wherein the conductive tip and the connection part are integrally formed.

7. The input device of claim 1,
wherein the connection part is fixed to the body of the input device, and
wherein the conductive tip passes through the connection part, and is configured to elastically move in and out of the connection part along an axis of the connection part.

8. An electronic device comprising:
a touch screen;
an electrode unit; and
a processor configured to:
analyze, based on a first electrode of the electrode unit coupling with a conductive tip of an input device and a second electrode of the electrode unit coupling with a metal member of the input device, signals received through the electrode unit,
identify a tilt characteristic of the input device based on the analyzed signals, and
compensate an input point on the touch screen according to the tilt characteristic.

9. The electronic device of claim 8,
wherein, based on a tilt angle of the input device being within a predetermined allowable range, the processor is further configured to identify the input point based on a location of at least one electrode in which a greatest intensity of signal is received from among a plurality of electrodes, and
wherein, based on the tilt angle of the input device being outside of the predetermined allowable range, the processor is further configured to compensate the input point based on a point which is shifted from the identified input point in a direction opposite to a tilt direction of the input device.

10. The electronic device of claim 8,
wherein, based on the tilt angle of the input device being within a predetermined allowable range, the processor is further configured to perform a first control operation, and wherein, based on the tilt angle of the input device being outside of the predetermined allowable range, the processor is further configured to perform a second control operation which is different from the first control operation.

11. The electronic device of claim 8,
wherein, based on the input device touching the touch screen and a touch location being changed, the processor is further configured to control the touch screen to display a writing trace continuously along the changed location, and
wherein the processor is further configured to change at least one of a function of the input device, a thickness, a brightness, a color, a chroma, a size, or a shape of the writing trace according to the tilt angle of the input device.

12. The electronic device of claim 8,
wherein, based on an object being displayed on the touch screen and the input device touching one point of the touch screen and being tilted, the processor is further configured to move the object according to the tilt direction and the tilt angle of the input device.

13. A control method of an electronic device, comprising:
analyzing, based on a first electrode of an electrode unit coupling with a conductive tip of an input device and a second electrode of the electrode unit coupling with a metal member of the input device, signals received through the electrode unit,
identifying a tilt characteristic of the input device; and
compensating an input point on the touch screen based on the tilt characteristic.

14. The control method of claim 13, further comprising:
determining, based on a tilt angle of the input device being within a predetermined allowable range, the input point based on a location of at least one electrode in which a greatest intensity of signal is received from among a plurality of electrodes; and
compensating, based on the tilt angle of the input device being outside of the predetermined allowable range, the input point based on a point which is shifted from the identified input point in a direction opposite to a tilt direction of the input device.

15. The control method of claim 13, further comprising:
performing, based on the tilt angle of the input device being within a predetermined allowable range, a first control operation; and
performing, based on the tilt angle of the input device being outside of the predetermined allowable range, a second control operation which is different from the first control operation.

16. The control method of claim 13, further comprising:
displaying, based on the input device touching the touch screen and a touch location being changed, a writing trace continuously along the changed location; and
changing at least one of a thickness, a brightness, a color, a chroma, a size, or a shape of the writing trace according to the tilt angle of the input device.

17. The control method of claim 13, further comprising, based on an object being displayed on the touch screen and the input device touching one point of the touch screen and being tilted, moving the object according to the tilt direction and the tilt angle of the input device.

* * * * *